United States Patent
Mun et al.

(10) Patent No.: US 12,513,381 B2
(45) Date of Patent: Dec. 30, 2025

(54) IMAGE SENSOR INCLUDING NANO-PHOTONIC MICROLENS ARRAY AND ELECTRONIC APPARATUS INCLUDING THE IMAGE SENSOR

(71) Applicant: SAMSUNG ELECTRONICS CO., LTD., Suwon-si (KR)

(72) Inventors: Sangeun Mun, Suwon-si (KR); Sookyoung Roh, Suwon-si (KR); Sungmo Ahn, Suwon-si (KR); Choonlae Cho, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 228 days.

(21) Appl. No.: 18/216,014

(22) Filed: Jun. 29, 2023

(65) Prior Publication Data

US 2024/0015383 A1 Jan. 11, 2024

(30) Foreign Application Priority Data

Jul. 5, 2022 (KR) .................... 10-2022-0082762

(51) Int. Cl.
*H04N 23/55* (2023.01)
*G02B 3/00* (2006.01)

(52) U.S. Cl.
CPC .......... *H04N 23/55* (2023.01); *G02B 3/0056* (2013.01); *G02B 2207/101* (2013.01)

(58) Field of Classification Search
CPC . H04N 23/55; G02B 3/0056; G02B 2207/101
(Continued)

(56) References Cited

U.S. PATENT DOCUMENTS 11,086,143 B1 * 8/2021 Gill .................... G02F 1/13471
11,175,182 B2 11/2021 Kim et al.
(Continued)

FOREIGN PATENT DOCUMENTS

KR        10-1772968 B1     8/2017
KR    10-2021-0046989 A     4/2021
(Continued)

OTHER PUBLICATIONS

Sozo Yokogawa, "Nanophotonics contributions to state-of-the-art CMOS Image Sensors", 2019 IEEE International Electron Devices Meeting, ISSS, Dec. 7, 2019, XP033714465, 4 pages, DOI: 10.1109/IEDM19573.2019.8993560.
(Continued)

*Primary Examiner* — Joel W Fosselman
(74) *Attorney, Agent, or Firm* — Sughrue Mion, PLLC

(57) ABSTRACT

An image sensor includes a sensor substrate including a plurality of pixels for sensing incident light, and a nano-photonic microlens array arranged to face a light incident surface of the sensor substrate, and including a plurality of nano-photonic microlenses for condensing incident light. Each of the plurality of pixels includes a plurality of photosensitive cells that are two-dimensionally arranged in a first direction and a second direction perpendicular to the first direction and are configured to independently sense the incident light, and an isolation for electrically isolating the plurality of photosensitive cells, each of the nano-photonic microlenses includes a plurality of nano-structures that are arranged such that the light transmitting each of the nano-photonic microlenses has a convex phase profile, and the plurality of nano-structures are arranged in the form of a two-dimensional array in a diagonal direction between the first direction and the second direction.

19 Claims, 37 Drawing Sheets

(58) Field of Classification Search
USPC .......................................................... 348/302
See application file for complete search history.

(56) References Cited

U.S. PATENT DOCUMENTS

| | | | |
|---|---|---|---|
| 11,258,993 B2 | 2/2022 | Hoshino | |
| 2021/0118932 A1 | 4/2021 | Cho et al. | |
| 2021/0126029 A1* | 4/2021 | Roh | ...................... H10F 39/182 |
| 2022/0141427 A1 | 5/2022 | Roh et al. | |
| 2023/0139533 A1 | 5/2023 | Mun et al. | |
| 2023/0251403 A1 | 8/2023 | Park et al. | |
| 2023/0324586 A1 | 10/2023 | Yun et al. | |

FOREIGN PATENT DOCUMENTS

| | | |
|---|---|---|
| KR | 10-2021-0049670 A | 5/2021 |
| KR | 10-2022-0058386 A | 5/2022 |
| KR | 10-2022-0058387 A | 5/2022 |
| KR | 10-2022-0058388 A | 5/2022 |

OTHER PUBLICATIONS

Communication issued Oct. 11, 2023 by the European Patent Office in European Patent Application No. 23183250.2.
Communication issued on Nov. 4, 2023 by the Korean Intellectual Property Office in Korean Patent Application No. 10-2022-0082762.
Office Action issued Oct. 14, 2025 by the Korean Patent Office for KR Patent Application No. 10-2025-0021707.

* cited by examiner

IMAGE SENSOR INCLUDING NANO-PHOTONIC MICROLENS ARRAY AND ELECTRONIC APPARATUS INCLUDING THE IMAGE SENSOR

CROSS-REFERENCE TO RELATED APPLICATION

This application is based on and claims priority under 35 U.S.C. § 119 to Korean Patent Application No. 10-2022-0082762, filed on Jul. 5, 2022, in the Korean Intellectual Property Office, the disclosure of which is incorporated by reference herein in its entirety.

BACKGROUND

1. Field

The disclosure relates to an image sensor including a nano-photonic microlens array and an electronic apparatus including the same.

2. Description of the Related Art

As the resolution of an image sensor increases, a size of a unit pixel in the image sensor has been gradually decreased. In order to prevent degradation of image quality in a low-light environment, a technique of forming a pixel representing one color by binding a plurality of independent photosensitive cells has been suggested. For example, a pixel representing one color may include a total of four photosensitive cells arranged in a 2×2 format. In this case, an output signal from the pixel may be a sum of output signals from four photosensitive cells. Also, an auto-focusing function may be implemented in a phase-detection auto-focusing method by using the pixel having the four photosensitive cells. For example, an auto-focusing signal may be generated by using differences among signals output from a plurality of photosensitive cells included in one pixel.

SUMMARY

Provided are an image sensor having improved light utilization efficiency and auto-focusing function and including a nano-photonic microlens array and an electronic apparatus including the image sensor.

Additional aspects will be set forth in part in the description which follows and, in part, will be apparent from the description, or may be learned by practice of the presented embodiments of the disclosure.

According to an aspect of an example embodiment, an image sensor includes: a sensor substrate including a plurality of pixels configured to sense incident light; and a nano-photonic microlens array arranged to face a light incident surface of the sensor substrate, the nano-photonic microlens array including a plurality of nano-photonic microlenses configured to condense the incident light, wherein each pixel of the plurality of pixels includes: a plurality of photosensitive cells that are two-dimensionally arranged in a first direction and a second direction perpendicular to the first direction and are configured to independently sense the incident light, and one or more isolation structures configured to electrically isolate the plurality of photosensitive cells from each other, wherein each nano-photonic microlens of the plurality of nano-photonic microlenses includes a plurality of nano-structures that are configured to output light having a convex phase profile, and wherein the plurality of nano-structures are arranged in a two-dimensional array in a diagonal direction between the first direction and the second direction.

A first interval between two nano-structures that are adjacent to each other in the first direction or the second direction, among the plurality of nano-structures, may be greater than or equal to a second interval between two nano-structures that are adjacent to each other in the diagonal direction, among the plurality of nano-structures.

A first arrangement period of the plurality of nano-structures arranged in the first direction or the second direction may be greater than or equal to a second arrangement period of the plurality of nano-structures arranged in the diagonal direction.

Each nano-structure of the plurality of nano-structures arranged in each nano-photonic microlens of the plurality of nano-photonic microlenses may have a width or a diameter such that a phase of the light after passing through a center portion of each nano-photonic microlens is largest and is reduced away from the center portion of each nano-photonic microlens.

A nano-structure arranged at the center portion of each nano-photonic microlens faces, in a vertical direction, a cross point between a first isolation structure extending in the first direction and a second isolation structure extending in the second direction.

A nano-structure that is closest to the nano-structure arranged at the center portion of each nano-photonic microlens may be arranged so as not to face the one or more isolation structures in a vertical direction.

From among the plurality of nano-structures arranged in each nano-photonic microlens, nano-structures having same widths or same diameters may be arranged in the form of a rectangle inclined in the diagonal direction and surround other nano-structures.

The light after passing through each nano-photonic microlens may have a phase profile formed as a rectangle inclined in the diagonal direction.

A minimum value of the phase of light after passing through each nano-photonic microlens, on a cross-section passing through the center portion of each nano-photonic microlens in the first direction, may be greater than a minimum value of the phase of light after passing through each nano-photonic microlens on a cross-section passing an edge of each nano-photonic microlens in the first direction.

The plurality of nano-photonic microlenses may correspond to the plurality of pixels in a one-to-one correspondence, and each nano-photonic microlens of the plurality of nano-photonic microlenses may be arranged to condense incident light to one pixel from among the plurality of pixels corresponding to the respective nano-photonic microlenses.

In each pixel of the plurality of pixels, the plurality of photosensitive cells may be arranged in a 2×2 array, each nano-photonic microlens of the plurality of nano-photonic microlenses may be arranged to face the plurality of photosensitive cells arranged in the 2×2 array, and a focusing spot formed by each of the plurality of nano-photonic microlenses may be located at a center of the 2×2 array.

Each pixel of the plurality of pixels may include four sub-pixels arranged in a 2×2 array, and the plurality of photosensitive cells are arranged in a 2×2 array in each sub-pixel of the four sub-pixels.

The plurality of nano-photonic microlenses may correspond to the four sub-pixels in a one-to-one correspondence, each nano-photonic microlens of the plurality of nano-photonic microlenses may be arranged to face the plurality of photosensitive cells that are arranged in the 2×2 array so as to condense incident light to a corresponding sub-pixel from among the four sub-pixels, and a focusing spot formed by each nano-photonic microlens of the plurality of nano-photonic microlenses may be located at the center of the 2×2 array including the plurality of photosensitive cells.

The image sensor may further include a color filter layer between the sensor substrate and the nano-photonic microlens array.

The color filter layer may include a plurality of color filters that respectively transmit light of different wavelength bands of the incident light, and each color filter of the plurality of color filters may include one of an organic color filter, an inorganic color filter, or an organic/inorganic hybrid color filter.

The image sensor may further include an anti-reflection layer on a light incident surface of the nano-photonic microlens array.

Each of the plurality of nano-photonic microlenses may further include a dielectric layer filled in a space among the plurality of nano-structures, and a refractive index of the plurality of nano-structures may be greater than a refractive index of the dielectric layer.

Each nano-structure of the plurality of nano-structures may have a circular column shape, a polygonal column shape, a cylindrical shape, or a polygonal container shape.

Each nano-structure of the plurality of nano-structures may include a first nano-structure and a second nano-structure provided on the first nano-structure.

According to an aspect of an example embodiment, an electronic apparatus includes: a lens assembly configured to form an optical image of a subject; an image sensor configured to convert the optical image formed by the lens assembly into an electrical signal; and a processor configured to process a signal generated by the image sensor, wherein the image sensor includes: a sensor substrate including a plurality of pixels configured to sense incident light; and a nano-photonic microlens array arranged to face a light incident surface of the sensor substrate, the nano-photonic microlens array including a plurality of nano-photonic microlenses configured to condense the incident light, wherein each of the plurality of pixels includes: a plurality of photosensitive cells that are two-dimensionally arranged in a first direction and a second direction perpendicular to the first direction and are configured to independently sense the incident light, and one or more isolation structures configured to electrically isolate the plurality of photosensitive cells from each other, wherein each nano-photonic microlens of the plurality of nano-photonic microlenses includes a plurality of nano-structures that are configured to output light having a convex phase profile, and wherein the plurality of nano-structures are arranged in a two-dimensional array in a diagonal direction between the first direction and the second direction.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
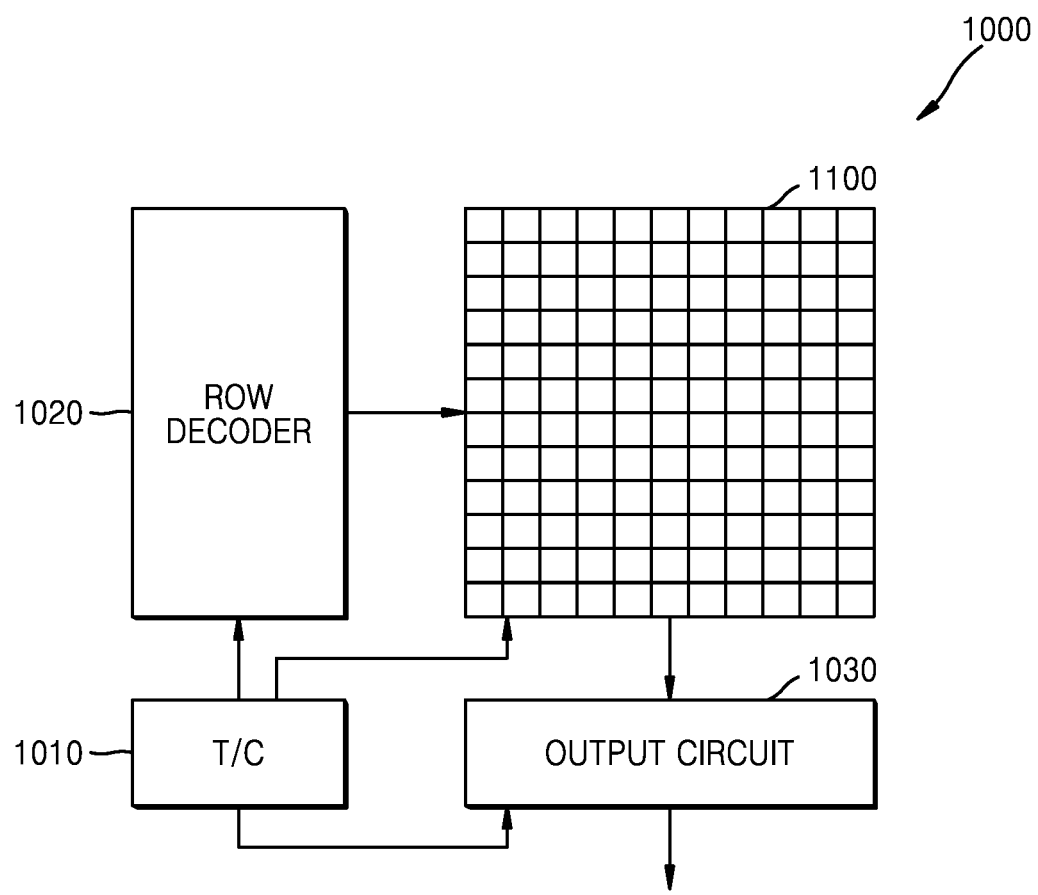
FIG. 1 is a block diagram of an image sensor according to an example embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the example embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

Hereinafter, an image sensor including a nano-photonic microlens array and an electronic apparatus including the image sensor will be described in detail with reference to accompanying drawings. The example embodiments of the disclosure are capable of various modifications and may be embodied in many different forms. In the drawings, like reference numerals denote like components, and sizes of components in the drawings may be exaggerated for convenience of explanation.

When a layer, a film, a region, or a panel is referred to as being "on" another element, it may be directly on/under/at left/right sides of the other layer or substrate, or intervening layers may also be present.

It will be understood that although the terms "first," "second," etc. may be used herein to describe various components, these components should not be limited by these terms. These components are only used to distinguish one component from another. These terms do not limit that materials or structures of components are different from one another.

An expression used in the singular encompasses the expression of the plural, unless it has a clearly different meaning in the context. It will be further understood that when a portion is referred to as "comprises" another component, the portion may not exclude another component but may further comprise another component unless the context states otherwise.

In addition, the terms such as " . . . unit", "module", etc. provided herein indicates a unit performing a function or operation, and may be realized by hardware, software, or a combination of hardware and software. For example, according to an example, "units" or " . . . modules" may be implemented by a processor, by one or more hardware components, by one or more electronic components and/or circuits.

The use of the terms of "the above-described" and similar indicative terms may correspond to both the singular forms and the plural forms.

Also, the steps of all methods described herein may be performed in any suitable order unless otherwise indicated herein or otherwise clearly contradicted by context. Also, the use of all exemplary terms (for example, etc.) is only to describe a technical spirit in detail, and the scope of rights is not limited by these terms unless the context is limited by the claims.

FIG. 1 is a schematic block diagram of an image sensor 1000 according to an example embodiment. Referring to FIG. 1, the image sensor 1000 may include a pixel array 1100, a timing controller (T/C) 1010, a row decoder 1020, and an output circuit 1030. The image sensor 1000 may include a charge-coupled device (CCD) image sensor or a complementary metal oxide semiconductor (CMOS) image sensor.

The pixel array 1100 includes pixels that are two-dimensionally arranged in a plurality of rows and columns. The row decoder 1020 selects one of the rows in the pixel array 1100 based on a row address signal output from the timing controller 1010. According to an example embodiment, the row decoder 1020 selects one of the rows in the pixel array 1100 in response to a row address signal output from the timing controller 1010. The output circuit 1030 outputs a photosensitive signal, in a column unit, from a plurality of pixels arranged in the selected row. To this end, the output circuit 1030 may include a column decoder and an analog-to-digital converter (ADC). For example, the output circuit 1030 may include a plurality of ADCs that are arranged respectively to columns between the column decoder and the pixel array 1100, or one ADC arranged at an output end of the column decoder. The timing controller 1010, the row decoder 1020, and the output circuit 1030 may be implemented as one chip or in separate chips. A processor for processing an image signal output from the output circuit 1030 may be implemented as one chip along with the timing controller 1010, the row decoder 1020, and the output circuit 1030.

The pixel array 1100 may include a plurality of pixels that sense light of different wavelengths. The pixel arrangement may be implemented in various ways. For example, FIGS. 2A to 2C show various pixel arrangements in the pixel array 1100 of the image sensor 1000.

Figure 2A:
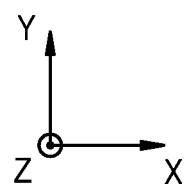
FIGS. 2A to 2C are diagrams showing examples of various pixel arrangements in a pixel array of an image sensor.
Figure 2B:
Figure 2C:
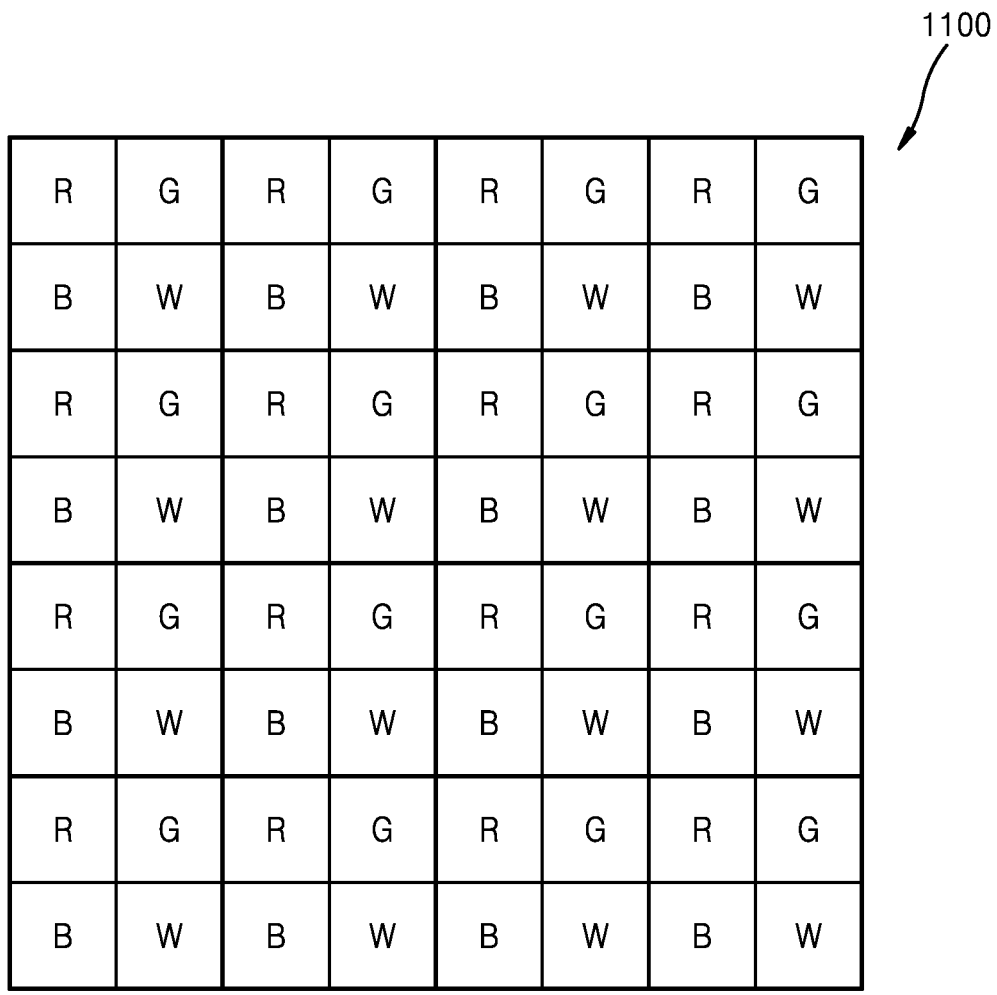

FIG. 2A shows a Bayer pattern that is generally adopted in the image sensor 1000. Referring to FIG. 2A, one unit pattern includes four quadrant regions, and first through fourth quadrants may be the blue pixel B, the green pixel G, the red pixel R, and the green pixel G, respectively. The unit patterns may be repeatedly and two-dimensionally arranged in a first direction (X direction) and a second direction (Y direction). In other words, two green pixels G are arranged in one diagonal direction and one blue pixel B and one red pixel R are arranged in another diagonal direction in a unit pattern of a 2×2 array. In the entire arrangement of pixels, a first row in which a plurality of green pixels G and a plurality of blue pixels B are alternately arranged in the first direction and a second row in which a plurality of red pixels R and a plurality of green pixels G are alternately arranged in the first direction are repeatedly arranged in a second direction.

The pixel array 1100 may be arranged in various arrangement patterns, rather than the Bayer pattern. For example, referring to FIG. 2B, a CYGM arrangement, in which a magenta pixel M, a cyan pixel C, a yellow pixel Y, and a green pixel G configure one unit pattern, may be used. Also, referring to FIG. 2C, an RGBW arrangement, in which a green pixel G, a red pixel R, a blue pixel, and a white pixel W configure one unit pattern, may be used. Although not shown in the drawings, the unit pattern may have a 3×2 array form. In addition to the above examples, the pixels in the pixel array 1100 may be arranged in various ways according to color characteristics of the image sensor 1000. Hereinafter, it will be described that the pixel array 1100 of the image sensor 1000 has a Bayer pattern, but the operating principles may be applied to other patterns of pixel arrangement than the Bayer pattern.

Hereinafter, for convenience of description, an example in which the pixel array 1100 has a Bayer pattern structure will be described as an example.

Figure 3:
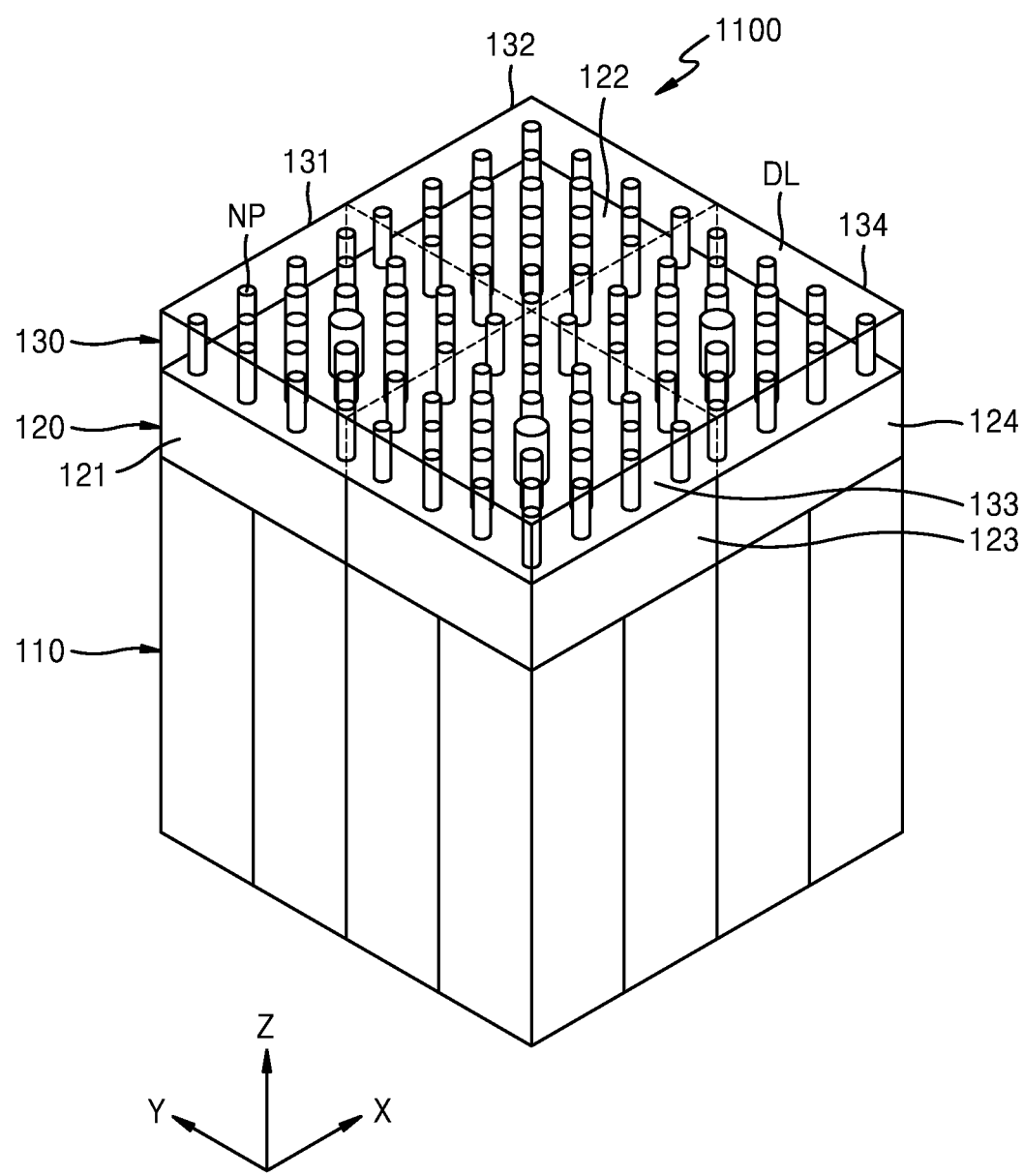
FIG. 3 is a perspective view schematically showing a structure of a pixel array in an image sensor according to an example embodiment.

FIG. 3 is a perspective view schematically showing a structure of a pixel array 1100 in an image sensor according to an example embodiment. Referring to FIG. 3, the pixel array 1100 may include a sensor substrate 110, a color filter layer 120 on the sensor substrate 110, and a nano-photonic microlens array 130 on the color filter layer 120.

Figure 4:
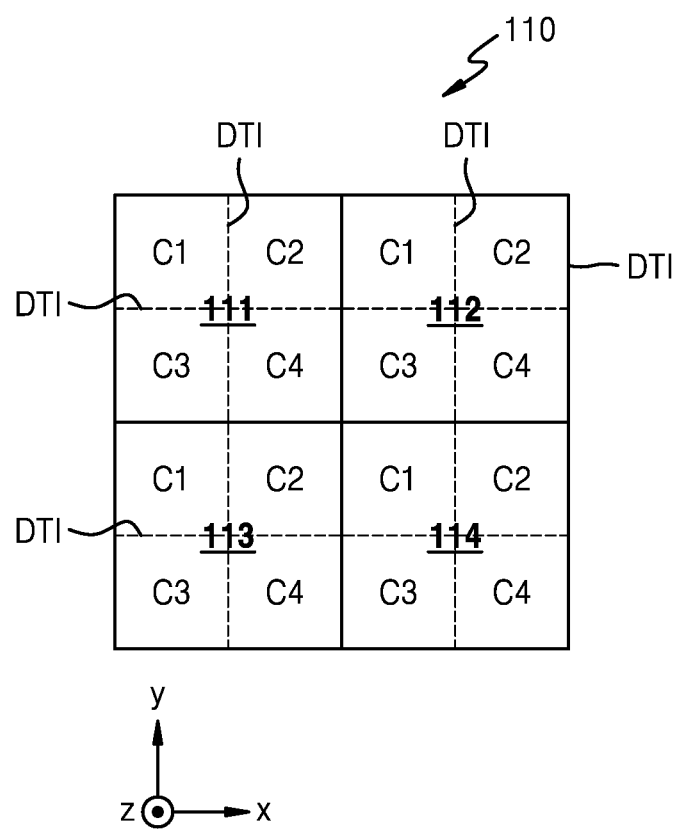
FIG. 4 is a plan view schematically showing a structure of a sensor substrate in the pixel array of FIG. 3.

FIG. 4 is a plan view schematically showing a structure of the sensor substrate 110 in the pixel array 1100 of FIG. 3. Referring to FIG. 4, the sensor substrate 110 may include a plurality of pixels sensing incident light. For example, the sensor substrate 110 may include a first pixel 111, a second pixel 112, a third pixel 113, and a fourth pixel 114 that convert incident light into electrical signals and generate an image signal. The first pixel 111, the second pixel 112, the third pixel 113, and the fourth pixel 114 may form one unit Bayer pattern. For example, the first and fourth pixels 111 and 114 may be green pixels sensing green light, the second pixel 112 may be a blue pixel sensing blue light, and the third pixel 113 may be a red pixel sensing red light.

FIGS. 3 and 4 show one unit Bayer pattern including four pixels as only an example, but the pixel array 1100 may include a plurality of Bayer patterns that are two-dimensionally arranged. For example, a plurality of first pixels 111 and a plurality of second pixels 112 may be alternately arranged in a first direction (X-direction), and a plurality of third pixels 113 and a plurality of fourth pixels 114 may be alternately arranged on a cross-section located differently in a second direction (Y-direction) perpendicular to the first direction (X-direction).

Each of the first pixel 111, the second pixel 112, the third pixel 113, and the fourth pixel 114 may include a plurality of photosensitive cells that independently sense incident light. For example, each of the first pixel 111, the second pixel 112, the third pixel 113, and the fourth pixel 114 may include a first photosensitive cell c1, a second photosensitive cells c2, a third photosensitive cell c3, and a fourth photosensitive cells c4. The first photosensitive cell c1, the second photosensitive cells c2, the third photosensitive cell c3, and the fourth photosensitive cells c4 may be two-dimensionally arranged in the first direction (X-direction) and the second direction (Y-direction). For example, in each of the first pixel 111, the second pixel 112, the third pixel 113, and the fourth pixel 114, the first photosensitive cell c1, the second photosensitive cells c2, the third photosensitive cell c3, and the fourth photosensitive cells c4 may be arranged in 2×2 array. However, the disclosure is not limited thereto, and as such, the number of photosensitive cells and/or the arrangement of the photosensitive cells in each of the pixels may be different.

According to the example embodiment, an auto-focusing signal may be obtained from a difference between output signals of adjacent photosensitive cells. For example, an auto-focusing signal in the first direction (X-direction) may be generated from a difference between output signals from the first photosensitive cell c1 and the second photosensitive cell c2, a difference between output signals from the third photosensitive cell c3 and the fourth photosensitive cell c4, or a difference between a sum of the output signals from the first photosensitive cell c1 and the third photosensitive cell c3 and a sum of the output signals from the second photosensitive cell c2 and the fourth photosensitive cell c4. Also, an auto-focusing signal in the second direction (Y-direction) may be generated from a difference between output signals from the first photosensitive cell c1 and the third photosensitive cell c3, a difference between output signals from the second photosensitive cell c2 and the fourth photosensitive cell c4, or a difference between a sum of the output signals from the first photosensitive cell c1 and the second photosensitive cell c2 and a sum of the output signals from the third photosensitive cell c3 and the fourth photosensitive cell c4.

In addition, a general image signal may be obtained by adding output signals from the first to fourth photosensitive cells c1, c2, c3, and c4. For example, a first green image signal may be generated by adding the output signals from the first to fourth photosensitive cells c1, c2, c3, and c4 of the first pixel 111, a blue image signal may be generated by adding the output signals from the first to fourth photosensitive cells c1, c2, c3, and c4 of the second pixel 112, a red image signal may be generated by adding the output signals from the first to fourth photosensitive cells c1, c2, c3, and c4 of the third pixel 113, and a second green image signal may be generated by adding the output signals from the first to fourth photosensitive cells c1, c2, c3, and c4 of the fourth pixel 114.

Also, each of the first to fourth pixels 111, 112, 113, and 114 may include an isolation (DTI) that electrically isolates the plurality of photosensitive cells from one another. The isolation DTI may have, for example, a deep trench isolation structure. The deep trench may be filled with air or an electrically insulating material. The isolation DTI may extend in the first direction (X-direction) and the second direction (Y-direction) so as to divide each of the first to fourth pixels 111, 112, 113, and 114 into four. The first to fourth photosensitive cells c1, c2, c3, and c4 in each of the first to fourth pixels 111, 112, 113, and 114 may be isolated from one another by the isolation DTI. The isolation DTI extending in the first direction (X-direction) and the isolation DTI extending in the second direction (Y-direction) may cross each other at the center of each of the first to fourth pixels 111, 112, 113, and 114.

Also, the isolations DTI may be arranged in the first direction (X-direction) and the second direction (Y-direction) between adjacent pixels from among the first to fourth pixels 111, 112, 113, and 114. Therefore, the first to fourth pixels 111, 112, 113, and 114 may be isolated from one another due to the isolations DTI. The isolation DTI extending in the first direction (X-direction) and the isolation DTI extending in the second direction (Y-direction) may cross each other at the center of the unit Bayer pattern including the first to fourth pixels 111, 112, 113, and 114.

Referring back to FIG. 3, the color filter layer 120 may be arranged between the sensor substrate 110 and the nano-photonic microlens array 130. The color filter layer 120 may include a plurality of color filters respectively transmitting light of different wavelengths in the incident light. The plurality of color filters may correspond to the plurality of pixels of the sensor substrate 110 in one-to-one correspondence. Each of the plurality of color filters may be arranged facing a corresponding pixel from among the plurality of pixels of the sensor substrate 110. For example, the color filter layer 120 may include a first color filter 121 facing the first pixel 111, a second color filter 122 facing the second pixel 112, a third color filter 123 facing the third pixel 113, and a fourth color filter 124 facing the fourth pixel 114. Like the first to fourth pixels 111, 112, 113, and 114, the plurality of first to fourth color filters 121, 122, 123, and 124 may be two-dimensionally arranged in the first direction (X-direction) and the second direction (Y-direction).

For example, the first and fourth color filters 121 and 124 may be green filters that transmit light of green wavelength band in the incident light, the second color filter 122 may be a blue filter that transmits light of blue wavelength band in the incident light, and the third color filter 123 may be a red filter that transmits light of red wavelength band in the incident light. The first to fourth color filters 121, 122, 123, and 124 may include organic color filters including an organic dye or an organic pigment.

The first to fourth color filters 121, 122, 123, and 124 may be arranged to face the first to fourth photosensitive cells c1, c2, c3, and c4 of the first to fourth pixels 111, 112, 113, and 114 respectively corresponding thereto. Therefore, the green light that has transmitted through the first color filter 121 may be incident on the first to fourth photosensitive cells c1, c2, c3, and c4 of the first pixel 111, the blue light that has transmitted through the second color filter 122 may be incident on the first to fourth photosensitive cells c1, c2, c3, and c4 of the second pixel 112, the red light that has transmitted through the third color filter 123 may be incident on the first to fourth photosensitive cells c1, c2, c3, and c4 of the third pixel 113, and the green light that has transmitted through the fourth color filter 124 may be incident on the first to fourth photosensitive cells c1, c2, c3, and c4 of the fourth pixel 114.

The nano-photonic microlens array 130 may be provided on the color filter layer 120 so as to face a light incident surface of the sensor substrate 110. The nano-photonic microlens array 130 may include a plurality of nano-photonic microlenses that respectively condense the incident light to the corresponding pixels from among the first to fourth pixels 111, 112, 113, and 114. The plurality of nano-photonic microlenses may correspond to the plurality of pixels in the sensor substrate 110 and the plurality of color filters of the color filter layer 120 in one-to-one correspondence. For example, the nano-photonic microlens array 130 may include a first nano-photonic microlens 131 arranged on the first color filter 121 so as to face the first pixel 111 in a third direction (Z-direction), a second nano-photonic microlens 132 arranged on the second color filter 122 so as to face the second pixel 112 in the third direction (Z-direction), a third nano-photonic microlens 133 arranged on the third color filter 123 so as to face the third pixel 113 in the third direction (Z-direction), and a fourth nano-photonic microlens 134 arranged on the fourth color filter 124 so as to face the fourth filter 124 in the third direction (Z-direction). Therefore, each of the plurality of first to fourth nano-photonic microlenses 131, 132, 133, and 134 may be arranged facing the first to fourth photosensitive cells c1, c2, c3, and c4 of the pixel corresponding thereto from among the first to fourth pixels 111, 112, 113, and 114. Like the first to fourth pixels 111, 112, 113, and 114, the plurality of first to fourth nano-photonic microlenses 131, 132, 133, and 134 may be two-dimensionally arranged in the first direction (X-direction) and the second direction (Y-direction).

The first nano-photonic microlens 131 condenses the incident light to the first pixel 111, the second nano-photonic microlens 132 condenses the incident light to the second pixel 112, the third nano-photonic microlens 133 condenses the incident light to the third pixel 113, and the fourth nano-photonic microlens 134 condenses the incident light to the fourth pixel 114. In the incident light that is condensed, the light of green wavelength band only passes through the first and fourth color filters 121 and 124 and is condensed to the first and fourth pixels 111 and 114, the light of blue wavelength band only passes through the second color filter 122 and is condensed to the second pixel 112, and the light of red wavelength band only passes through the third color filter 123 and is condensed to the third pixel 113.

According to an example embodiment, the first nano-photonic microlens 131 may be configured to focus or direct the incident light to the first pixel 111, the second nano-photonic microlens 132 may be configured to focus or direct the incident light to the second pixel 112, the third nano-photonic microlens 133 may be configured to focus or direct the incident light to the third pixel 113, and the fourth nano-photonic microlens 134 may be configured to focus or direct the incident light to the fourth pixel 114. According to this configuration, the light of green wavelength band only passes through the first and fourth color filters 121 and 124 and is focused or directed to the first and fourth pixels 111 and 114, the light of blue wavelength band only passes through the second color filter 122 and is focused or directed to the second pixel 112, and the light of red wavelength band only passes through the third color filter 123 and is focused or directed to the third pixel 113.

The first to fourth nano-photonic microlenses 131, 132, 133, and 134 may each have a nano-pattern structure that may condense the incident light. The nano-pattern structure may include a plurality of nano-structures NP which change a phase of the incident light to be different according to incident positions in the respective first to fourth nano-photonic microlenses 131, 132, 133, and 134. Shapes, sizes (widths and heights), intervals, and arrangement types of the plurality of nano-structures NP may be determined such that the light immediately after passing through each of the first to fourth nano-photonic microlenses 131, 132, 133, and 134 may have a certain phase profile. According to the phase profile, a focal length of the light after passing through each of the first to fourth nano-photonic microlenses 131, 132, 133, and 134 may be determined.

Figure 5:
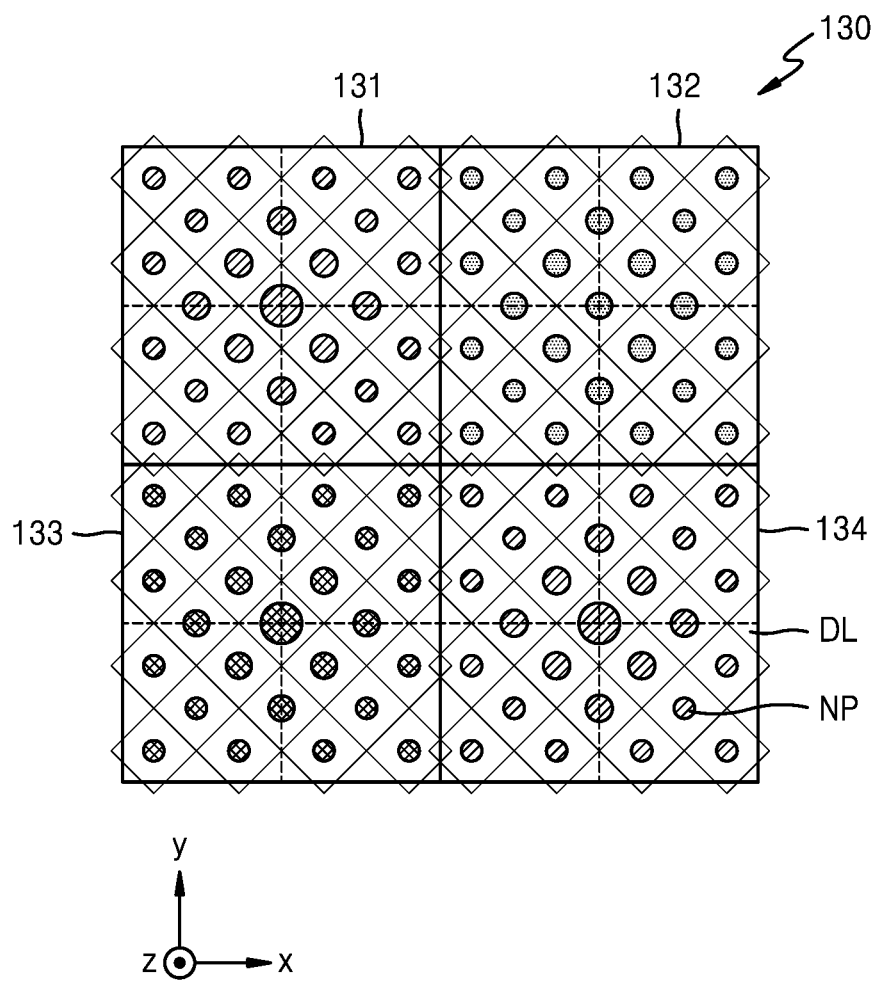
FIG. 5 is a plan view schematically showing a structure of a nano-photonic microlens array according to an example embodiment of FIG. 3.

FIG. 5 is a plan view schematically showing a structure of the nano-photonic microlens array 130 according to an example embodiment of FIG. 3. Referring to FIG. 3 and FIG. 5, the nano-structures NP of the nano-photonic microlens array 130 may each include a nano-column, a width or a cross-section of which has a diameter having sub-wavelength dimension. The sub-wavelength refers to a wavelength that is less than a wavelength band of the light condensed by the nano-photonic microlens array 130. When the incident light is a visible ray, the cross-sectional diameter of the nano-structure NP may be less than, for example, 400 nm, 300 nm, or 200 nm. A height of the nano-structure NP may be about 300 nm to about 1500 nm, which is greater than the cross-sectional diameter of the nano-structure.

The nano-structures NP may include a material having a relatively higher refractive index as compared with a peripheral material and having a relatively lower absorbent ratio in the visible ray band. For example, the nano-structures NP may include c-Si, p-Si, a-Si and a Group III-V compound semiconductor (GaP, GaN, GaAs etc.), SiC, $TiO_2$, $SiN_3$, ZnS, ZnSe, $Si_3N_4$, and/or a combination thereof. Periphery of the nano-structures NP may be filled with a dielectric material DL having a relatively lower refractive index as compared with the nano-structures NP and have a relatively low absorbent ratio in the visible ray band. For example, the periphery of the nano-structures NP may be filled with siloxane-based spin on glass (SOG), $SiO_2$, $Si_3N_4$, $Al_2O_3$, air, etc.

The refractive index of a high-refractive index nano-structures NP may be about 2.0 or greater with respect to the light of about 630 nm wavelength, and the refractive index of a low-refractive index dielectric material DL may be about 1.0 to about 2.0 or less with respect to the light of about 630 nm wavelength. Also, a difference between the refractive index of the nano-structures NP and the refractive index of the dielectric material DL may be about 0.5 or greater. The nano-structures NP having a difference in a refractive index from the refractive index of the peripheral material may change the phase of light that passes through the nano-structures NP. This is caused by phase delay that occurs due to the shape dimension of the sub wavelength of the nanostructures NP, and a degree at which the phase is delayed, may be determined by a detailed shape dimension and arrangement shape of the nanostructures NP.

The first to fourth nano-photonic microlenses 131, 132, 133, and 134 may each have a nano-pattern structure in which the plurality of nano-structures NP are arranged similarly. For example, each of the first to fourth nano-photonic microlenses 131, 132, 133, and 134 may have the same number of nano-structures NP. Also, the plurality of nano-structures NP may be arranged at the same positions respectively in the first to fourth nano-photonic microlenses 131, 132, 133, and 134. From among the plurality of nano-structures NP arranged in each of the first to fourth nano-photonic microlenses 131, 132, 133, and 134, the nano-structure NP arranged at a center portion in each of the first to fourth nano-photonic microlenses 131, 132, 133, and 134 may have the largest width or largest diameter, and then, the widths or diameters of the nano-structures NP may be reduced away from the center portion in each of the first to fourth nano-photonic microlenses 131, 132, 133, and 134.

The widths or diameters of the nano-structures NP in the first to fourth nano-photonic microlenses 131, 132, 133, and 134 may be different from one another in order for the first to fourth nano-photonic microlenses 131, 132, 133, and 134 to condense the light of different wavelength bands to corresponding pixels. For example, from among the nano-structures NP arranged respectively on the center portions of the first to fourth nano-photonic microlenses 131, 132, 133, and 134, the nano-structure NP at the center portion of the third nano-photonic microlens 133 condensing the red light may have the largest width or diameter, and the nano-structure NP at the center portion of the second nano-photonic microlens 132 condensing the blue light may have the smallest width or diameter. The widths or diameters of the nano-structures NP arranged at the center portions of the first and fourth nano-photonic microlenses 131 and 134 condensing the green light may be less than the width or diameter of the nano-structure NP arranged at the center portion of the third nano-photonic microlens 133 and may be greater than the width or diameter of the nano-structure NP arranged at the center portion of the second nano-photonic microlens 132.

Figure 6:
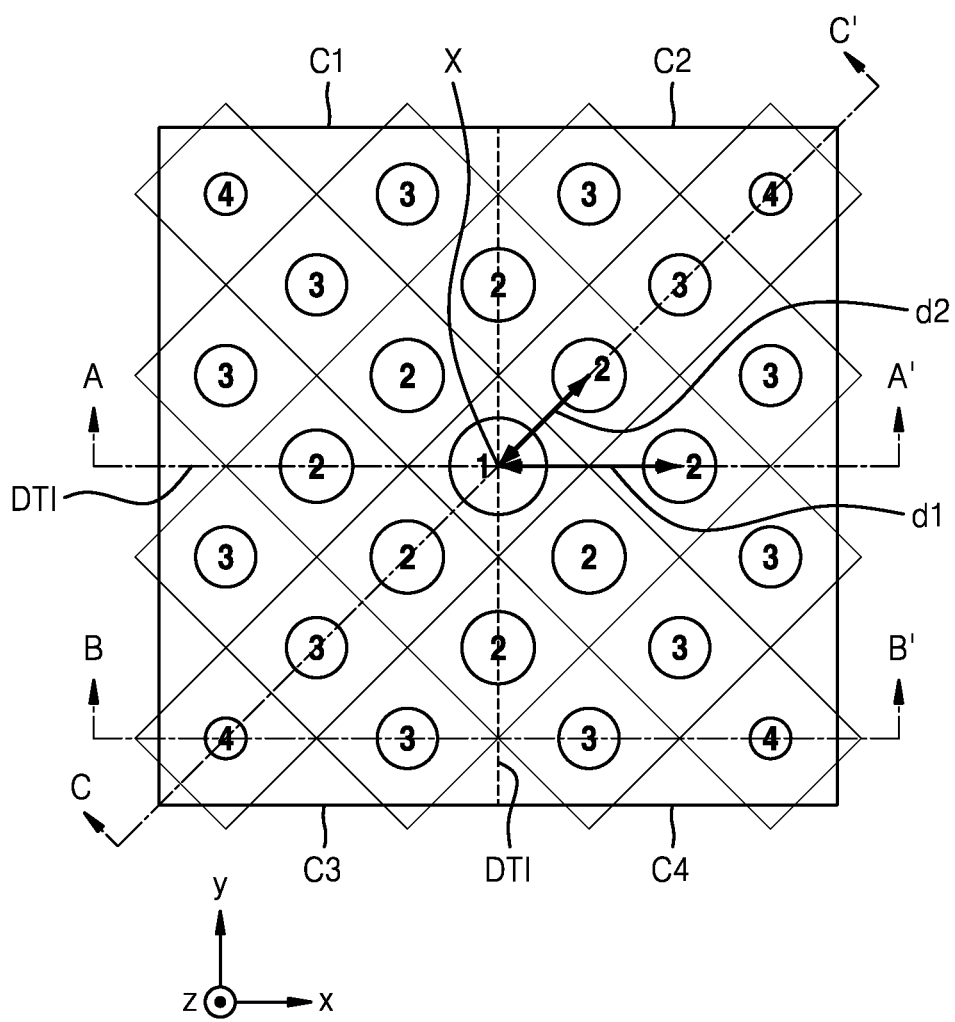
FIG. 6 is a plan view showing a nano-pattern structure of one nano-photonic microlens in the nano-photonic microlens array of FIG. 5.

FIG. 6 is a plan view showing a nano-pattern structure of one nano-photonic microlens in the nano-photonic microlens array of FIG. 5. Also, FIG. 6 shows an example of relative positions of the nano-structures NP with respect to the first to fourth photosensitive cells c1, c2, c3, and c4 in the pixel corresponding to the nano-photonic microlens. The nano-structures NP having the same widths or diameters in FIG. 6 are represented by the same number, and the number representing the nano-structure NP increases as the width or diameter of the nano-structure NP is reduced. The principle of the nano-pattern structure of the nano-photonic microlenses shown in FIG. 6 may be applied to the first to fourth nano-photonic microlenses 131, 132, 133, and 134 shown in FIG. 5.

Referring to FIG. 6, the plurality of nano-structures may be symmetrically arranged based on a first nano-structure 1 having the largest width or diameter in one nano-photonic microlens. The first nano-structure 1 may be arranged at the center portion of the nano-photonic microlens. Also, the first nano-structure 1 arranged at the center portion of the nano-photonic microlens may be arranged facing, in a vertical direction, a cross point X between the isolation DTI extending in the first direction (X-direction) and the isolation DTI extending in the second direction (Y-direction) in the pixel corresponding to the nano-photonic microlens.

According to an example embodiment, a nano-structure that is farther away from the center portion of the nano-photonic microlens may have less width or diameter. For example, a plurality of second nano-structures 2 having smaller dimensions than that of the first nano-structure 1 may be arranged to surround the first nano-structure 1. In addition, a plurality of third nano-structures 3 having smaller dimensions than those of the second nano-structures 2 may be arranged on the outer sides of the second nano-structures 2. A plurality of fourth nano-structures 4 having smaller dimensions than those of the third nano-structures 3 may be arranged near apexes of the nano-photonic microlens. That is, according to an example embodiment, the farther a nano-structure is away from the center portion of the nano-photonic microlens, the smaller the dimensions of the nano-structure.

FIG. 6 shows that the nano-photonic microlens includes total 25 nano-structures having four different widths or diameters, but one or more example embodiments are not limited thereto. Also, FIG. 6 shows that the nano-photonic microlens includes one largest first nano-structure 1, but there may be a plurality of first nano-structures 1 having the largest dimensions in the nano-photonic microlens. Alternatively, in some of the first to fourth nano-photonic microlenses 131, 132, 133, and 134, there may be a plurality of first nano-structures 1, and in some other nano-photonic microlenses, there may be only one first nano-structure 1. For example, the second nano-photonic microlens 132 condensing the blue light may include nine first nano-structures 1 having the same widths or diameters at the center portion thereof. The dimensions, number, and kinds of the nano-structures arranged in the nano-photonic microlens may be selected taking into account various elements such as optical characteristics of an objective lens of a camera, a pixel size, a size and sensitivity of the photosensitive cell, a light condensing efficiency, auto-focusing performance, a crosstalk, etc.

According to the example embodiment, the plurality of nano-structures in the nano-photonic microlens may be arranged in the form of a two-dimensional array in a diagonal direction between the first direction (X-direction) and the second direction (Y-direction). In other words, the plurality of nano-structures may be arranged in the form of the two-dimensional grating array that is inclined in the diagonal direction. Therefore, a figure formed by connecting four adjacent nano-structures so that another nano-structure may not exist therein may have a rectangular shape inclined in the diagonal direction of the nano-photonic microlens or the pixel. When each of the pixels or the nano-photonic microlenses has a square shape, an angle in which the arrangement of the plurality of nano-structures is inclined may be about 45°. When each of the pixels or the nano-photonic microlenses is not a square, the angle in which the arrangement of the plurality of nano-structure is inclined may vary depending on an aspect ratio of each pixel or each nano-photonic microlens and may be in a range of about 30° to about 60°.

In this case, the plurality of nano-structures may be arranged at constant period or interval along two diagonal directions in each pixel or each nano-photonic microlens. In other words, the period or interval between the plurality of nano-structures arranged in a first diagonal direction may be equal to the period or interval between the plurality of nano-structures arranged in a second diagonal direction that crosses the first diagonal direction. Also, the period or interval between the plurality of nano-structures may be consistent on all the cross-sections in the diagonal direction and in the direction parallel to the diagonal line. For example, the period or interval among the plurality of nano-structures (4, 3, 2, 1, 2, 3, 4) arranged along the diagonal direction passing the center of the nano-photonic microlens may be equal to the period or interval among the plurality of nano-structures (3, 2, 2, 2, 3) arranged in the direction that is parallel to the diagonal direction without passing the center of the nano-photonic microlens.

In an example, an interval d1 between two adjacent nano-structures in the first direction (X-direction) or the second direction (Y-direction) may be greater than an interval d2 between two adjacent nano-structures in the diagonal direction. Therefore, the arrangement period of the plurality of nano-structures arranged in the first direction (X-direction) or the second direction (Y-direction) may be greater than the arrangement period of the plurality of nano-structures arranged in the diagonal direction. In this case, the second nano-structure 2 may be arranged so as not to face the isolation DTI in the vertical direction because the second nano-structure 2 that is closest to the first nano-structure 1 arranged at the center of each nano-photonic microlens is located diagonally with respect to the first nano-structure 1.

FIG. 6 shows that three adjacent nano-structures are arranged in the form of isosceles triangle, but the three adjacent nano-structures may be arranged in the form of a regular triangle. For example, the first nano-structure 1, the second nano-structure 2 adjacent to the first nano-structure 1 in the first direction (X-direction), and the second nano-structure 2 adjacent to the first nano-structure 1 in the diagonal direction may be arranged in the form of an isosceles triangle having the largest bottom side, as shown in FIG. 6. However, one or more example embodiments are not limited thereto, and in another example, the first nano-structure 1, the second nano-structure 2 adjacent to the first nano-structure 1 in the first direction (X-direction), and the second nano-structure 2 adjacent to the first nano-structure 1 in the diagonal direction may be arranged in the form of the regular triangle. In this case, the interval d2 between two adjacent nano-structures in the first direction (X-direction) or the second direction (Y-direction) may be equal to the interval d1 between two adjacent nano-structures in the diagonal direction, and the arrangement period of the plurality of nano-structures arranged in the first direction (X-direction) or the second direction (Y-direction) may be equal to the arrangement period of the plurality of nano-structures arranged in the diagonal direction.

Also, from among the plurality of nano-structures arranged in each of the nano-photonic microlenses, a straight line connecting at least three nano-structures having the same widths or diameters may be arranged in parallel to the diagonal direction. For example, a straight line connecting three second nano-structures 2 or a straight line connecting three third nano-structures 3 may be in parallel to the diagonal direction. Accordingly, the nano-structures having the same widths or diameters may be arranged to surround other nano-structures in the form of a rectangular shape inclined in the diagonal direction. For example, the second nano-structures 2 are arranged in the form of a rectangular shape that is inclined in the diagonal direction while surrounding the first nano-structures 1, and the third nano-structures 3 may be arranged in the form of a rectangular shape that is inclined in the diagonal direction while surrounding the second nano-structures 2.

Figure 7:
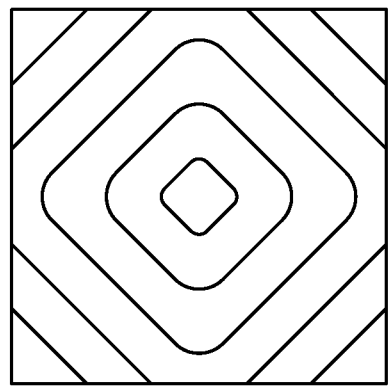
FIG. 7 is a diagram showing an example of a phase profile of transmitted light immediately after passing through the nano-photonic microlens of FIG. 6 in the form of contours.

FIG. 7 is a diagram showing an example of a phase profile of a transmitted light immediately after passing through the nano-photonic microlens of FIG. 6 in the form of contours. In FIG. 7, one rectangle is obtained by connecting points having the same phase. Referring to FIG. 7, immediately after passing through the nano-photonic microlens, that is, at the lower surface of the nano-photonic microlens, the transmitted light may have a phase profile formed as a rectangle inclined in the diagonal direction with respect to the nano-photonic microlens or the pixel. In FIG. 7, the innermost rectangle at the center of the nano-photonic microlens represents the largest phase, and the rectangle away from the center portion represents smaller phase than that of inside rectangle. Therefore, the phase of the transmitted light immediately after passing through the nano-photonic microlens is the largest at the center portion of the nano-photonic microlens and then may be gradually decreased toward the outer side. In addition, the phase of the transmitted light may be the smallest around four apexes of the nano-photonic microlens. In particular, a figure obtained by connecting the points having the same phase of transmitted light may have a rectangular shape that is inclined in the diagonal direction with respect to the nano-photonic microlens or the pixel.

Figure 8A:
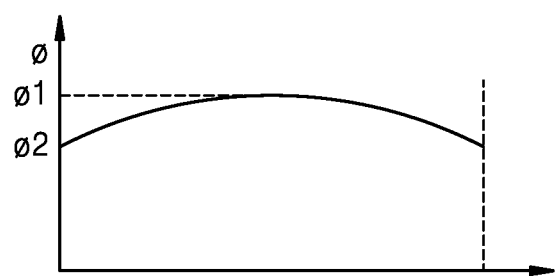
FIG. 8A is a diagram showing an example of a phase profile of a transmitted light on a cross-section of a nano-photonic microlens taken along line A-A' of FIG. 6.
Figure 8B:
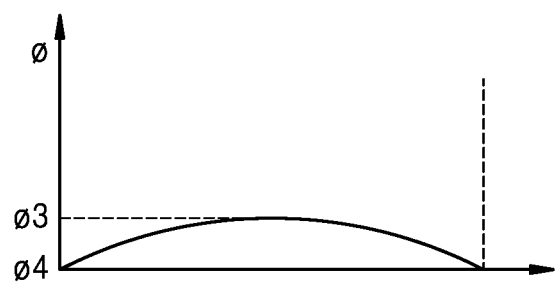
FIG. 8B is a diagram showing an example of a phase profile of the transmitted light on a cross-section of the nano-photonic microlens taken along line B-B' of FIG. 6.
Figure 8C:
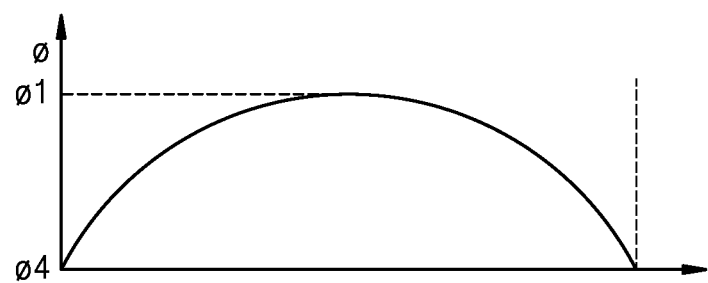
FIG. 8C is a diagram showing an example of a phase profile of the transmitted light on a cross-section of a nano-photonic microlens taken along line C-C' of FIG. 6.

FIG. 8A is a diagram showing an example of a phase profile of transmitted light on a cross-section of a nano-photonic microlens taken along line A-A' of FIG. 6, FIG. 8B is a diagram showing an example of a phase profile of the transmitted light on a cross-section of the nano-photonic microlens taken along line B-B' of FIG. 6, and FIG. 8C is a diagram showing an example of a phase profile of the transmitted light on a cross-section of a nano-photonic microlens taken along line C-C' of FIG. 6.

Referring to FIGS. 8A to 8C, the phase profile of the transmitted light immediately after passing through the nano-photonic microlens may have a convex shape. FIGS. 8A to 8C show the phase profile formed in a convex curve shape for convenience of description, but the transmitted light immediately after passing through the nano-photonic microlens may have a phase profile formed in a convex stair shape.

Referring to FIG. 8A, on a cross-section passing the center portion of the nano-photonic microlens in the first direction (X-direction) (that is, cross-section taken along line A-A'), the phase of light after passing through the nano-photonic microlens may have a maximum value ϕ1 at the center and a minimum value cP2 at opposite edges. Also, referring to FIG. 8B, on a cross-section passing the edge of the nano-photonic microlens in the first direction (X-direction) (that is, cross-section taken along line B-6'), the phase of light after passing through the nano-photonic microlens may have a maximum value cP3 at the center and may have a minimum value cP4 at opposite edges. The minimum value cP2 of the phase of light after passing through the nano-photonic microlens on the cross-section passing the center portion of the nano-photonic microlens in the first direction (X-direction) may be greater than the minimum value cP4 of the phase of the light after passing through the nano-photonic microlens on the cross-section passing the edge of the nano-photonic microlens.

Referring to FIG. 8C, on the cross-section in the diagonal direction of the nano-photonic microlens (that is, cross-section taken along line C-C'), the phase of light after passing through the nano-photonic microlens may have a maximum value ϕ1 at the center and may have a minimum value cP4 at the opposite edges. Therefore, the maximum value of the phase of light after passing through the nano-photonic microlens, on the cross-section in the diagonal direction, may be equal to the maximum value of the phase of light after passing through the nano-photonic microlens on the cross-section passing the center portion of the nano-photonic microlens. Also, the minimum value of the phase of light after passing through the nano-photonic microlens, on the cross-section in the diagonal direction, may be equal to the minimum value of the phase of light after passing through the nano-photonic microlens on the cross-section passing the edges of the nano-photonic microlens.

As described above, each of the nano-photonic microlenses includes a plurality of nano-structures that are arranged such that the light after passing through each of the nano-photonic microlenses has a phase profile that is convex. Then, each of the nano-photonic microlenses may condense the incident light to the corresponding pixel.

For example, the plurality of nano-structures NP arranged in each of the first to fourth nano-photonic microlenses 131, 132, 133, and 134 shown in FIG. 5 may be arranged so as to implement the phase profiles shown in FIGS. 7 and 8A to 8C. In other words, the plurality of nano-structures NP may be arranged so that the light passing through the center portion in each of the first to fourth nano-photonic microlenses 131, 132, 133, and 134 has the largest phase and the phase of the transmitted light is gradually decreased away from the center portion in each of the first to fourth nano-photonic microlenses 131, 132, 133, and 134. In general, the phase of the light after passing through each of the nano-structures NP may be in proportional to the width or diameter of the nano-structure NP. Accordingly, FIG. 5 illustrates that the width or diameter of the nano-structure NP arranged at the center portion of each of the first to fourth nano-photonic microlenses 131, 132, 133, and 134 is the largest.

However, the nano-structures NP arranged in the region having a relatively small phase delay do not necessarily have relatively smaller diameters. In the phase profiles shown in FIGS. 7 and 8A to 8C, a value of phase delay is indicated by a remainder value after subtracting a multiple of $2\pi$. For example, when a phase delay in a certain region is $3\pi$, the phase delay is optically the same as the remaining $\pi$ after removing $2\pi$. Therefore, when the diameter of the nano-structure NP is so small and is difficult to be manufactured, the width or diameter of the nano-structure NP may be selected so as to implement the delay phase increased by $2\pi$. For example, when the width or diameter of the nano-structure NP for achieving the phase delay of $0.5\pi$ is too small, the width or diameter of the nano-structure NP may be selected so as to achieve the phase delay of $2.5\pi$. Therefore, in another example, the width or diameter of the nano-structure NP arranged around the apex of each of the first to fourth nano-photonic microlenses 131, 132, 133, and 134 may be the largest, and the width or diameter of the nano-structure NP arranged at the center in each of the first to fourth nano-photonic microlenses 131, 132, 133, and 134 may be the second largest. Alternatively, the width or diameter of the nano-structure NP arranged at the center in each of the first to fourth nano-photonic microlenses 131, 132, 133, and 134 may be the smallest and the width or diameter of the nano-structure NP may be increased away from the center in each of the first to fourth nano-photonic microlenses 131, 132, 133, and 134.

Figure 9:
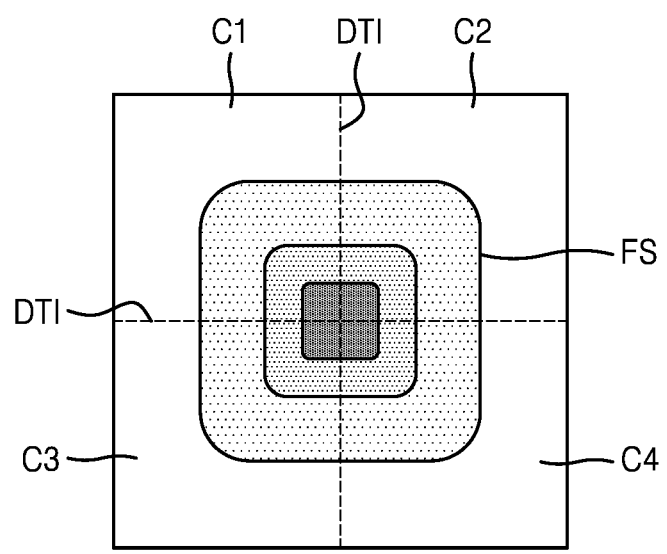
FIG. 9 is a plan view showing an example of a distribution of focusing spots formed on a pixel by the nano-photonic microlens of FIG. 6.

FIG. 9 is a plan view showing an example of a distribution of a focusing spot formed on a pixel by the nano-photonic microlens of FIG. 6. Referring to FIG. 9, a focusing spot FS formed by the nano-photonic microlenses may be mainly distributed on the center portion of the pixel. In other words, the focusing spot FS may be located at the center of 2×2 array including four photosensitive cells c1, c2, c3, and c4. Therefore, the focusing spot FS may be formed on a crossing point between two isolations DTI. Also, the focusing spot FS may have a rectangular shape that is similar to the shape of the pixel. In particular, the focusing spot FS may have a rectangular shape that is parallel to the rectangular shape of the pixel. Consequently, the focusing spot FS may spread to the center portion in each of the four photosensitive cells c1, c2, c3, and c4 in the pixel.

Figure 10:
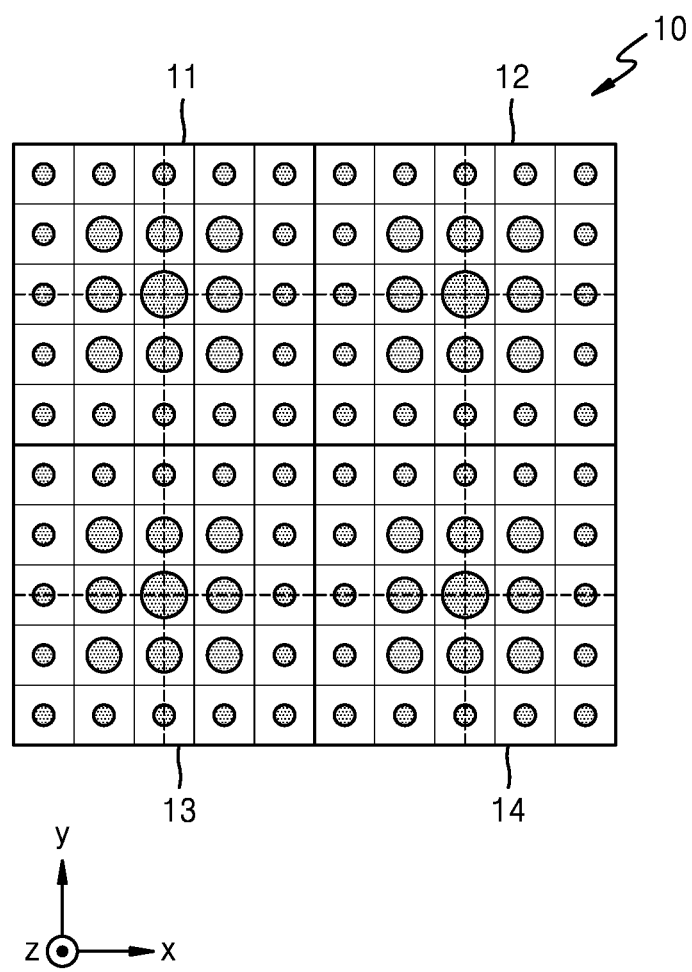
FIG. 10 is a plan view schematically showing a structure of a nano-photonic microlens array according to a comparative example.

FIG. 10 is a plan view schematically showing a structure of a nano-photonic microlens array 10 according to a comparative example. Referring to FIG. 10, in the nano-photonic microlens array 10 according to the comparative example, each of a plurality of nano-photonic microlenses 11, 12, 13, and 14 may include the nano-structures NP that are regularly arranged in the first direction (X-direction) and the second direction (Y-direction). Therefore, in the nano-photonic microlens array 10 according to the comparative example, the plurality of nano-structures NP are periodically arranged in a direction parallel to the direction in which the isolation is extended. As a result, the nano-structures NP of the nano-photonic microlens array 130 according to the example embodiment and the nano-structures NP of the nano-photonic microlens array 10 according to the comparative example may be arranged by being rotated by an angle in the diagonal direction with respect to each other.

Figure 11:
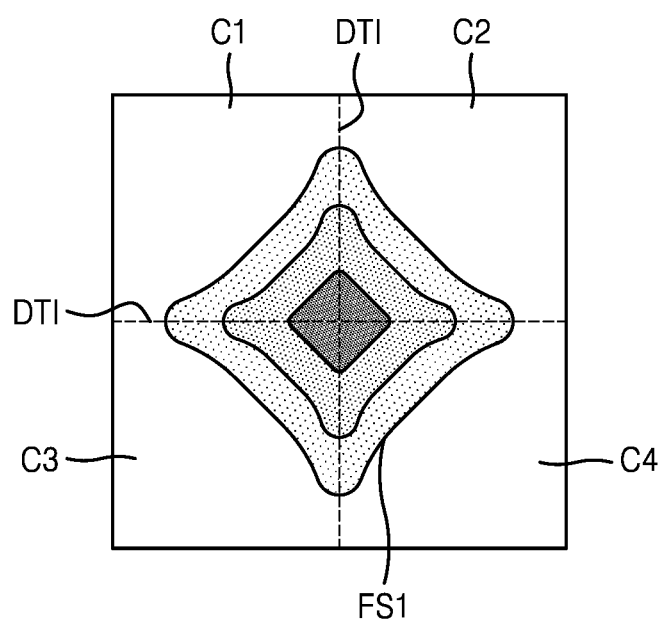
FIG. 11 is a plan view showing an example of a distribution of focusing spots formed on pixels by one nano-photonic microlens in the nano-photonic microlens array of FIG. 10.

FIG. 11 is a plan view showing an example of a distribution of focusing spots formed on pixels by one nano-photonic microlens in the nano-photonic microlens array 10 of FIG. 10. Referring to FIG. 11, a focusing spot FS1 formed by the nano-photonic microlens according to the comparative example may be mainly distributed on the center portion of the pixel. In particular, the focusing spot FS1 is inclined with respect to the rectangular shape of the pixel in the diagonal direction. Also, the focusing spot FS1 may have four concave sides. As a result, according to the comparative example, the focusing spot FS1 rarely spreads to the center portion in each of the four photosensitive cells c1, c2, c3, and c4 in the pixel.

When the distribution of the focusing spot FS shown in FIG. 9 is compared with the distribution of the focusing spot FS1 shown in FIG. 11, an overlapping area between the focusing spot FS1 according to the comparative example and the isolation DTI is greater than an overlapping area between the focusing spot FS according to the example embodiment and the isolation DTI. Therefore, when the nano-photonic microlens array 130 according to the example embodiment is used, light loss may be reduced as compared with the comparative example. Also, the focusing spot FS1 according to the comparative example rarely spreads to the center portions of the four photosensitive cells c1, c2, c3, and c4 in the pixel, but the focusing spot FS according to the example embodiment may spread to the center portions of the four photosensitive cells c1, c2, c3, and c4 in the pixel. That is, the distribution area of the focusing spot FS in the photosensitive cells c1, c2, c3, and c4 may be greater than that of the focusing spot FS1 according to the comparative example. As such, an intensity of an output signal from each of the photosensitive cells c1, c2, c3, and c4 may increase. Therefore, when the nano-photonic microlens array 130 according to the example embodiment is used, the crosstalk between adjacent photosensitive cells may be reduced, and accuracy of the auto-focusing function that is implemented by comparing the output signals from the adjacent photosensitive cells may be improved.

Figure 12:
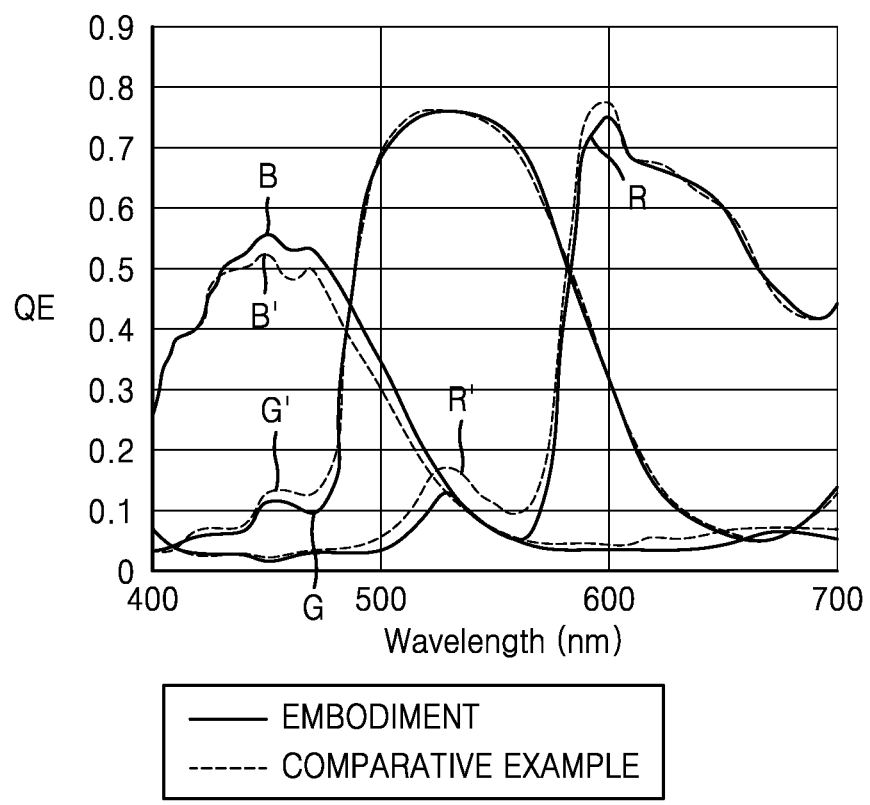
FIG. 12 is a graph for comparing the quantum efficiency of an image sensor including the nano-photonic microlens array of FIG. 5 with that of an image sensor including the nano-photonic microlens array of FIG. 10 according to the comparative example.

FIG. 12 is a graph for comparing the quantum efficiency of an image sensor including the nano-photonic microlens array of FIG. 5 with that of an image sensor including the nano-photonic microlens array of FIG. 10 according to the comparative example. In FIG. 12, graphs indicated as B', G', and R' represent a quantum efficiency of the image sensor according to the comparative example with respect to the blue light, green light, and red light, and graphs indicated as B, G, and R represent a quantum efficiency of the image sensor according to the example embodiment with respect to the blue light, green light, and red light. Referring to FIG. 12, the image sensor according to the example embodiment may have an improved quantum efficiency in the blue light region as compared with the image sensor according to the comparative example, and may have entirely reduced crosstalk. Accordingly, the auto-focusing function of the phase-detection auto-focusing method may be improved.

Figure 13A:
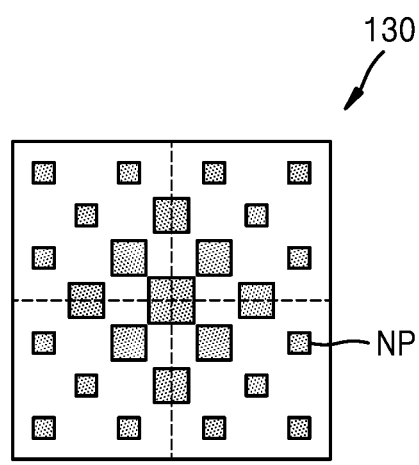
FIGS. 13A and 13B are plan views showing a structure of one nano-photonic microlens in a nano-photonic microlens array according to another example embodiment.
Figure 13B:
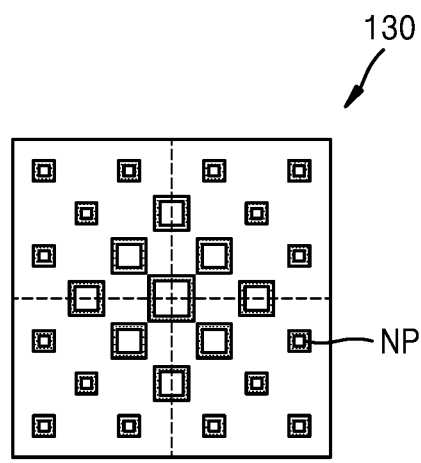

FIGS. 13A and 13B are plan views showing a structure of one nano-photonic microlens in a nano-photonic microlens array according to another example embodiment. In FIGS. 3, 5, and 6, the nano-structure NP in the nano-photonic microlens array 130 has a circular column shape, but the nano-structures NP may have various different shapes. For example, as shown in FIG. 13A, the nano-structure NP may have a polygonal column shape such as a rectangular column. Also, as shown in FIG. 13B, the nano-structure may have a polygonal container shape such as a rectangular container shape, or a cylindrical shape. The shape of the nano-structure NP may be selected taking into account various elements such as optical characteristics of an objective lens of a camera, a pixel size, a size and sensitivity of the photosensitive cell, a light condensing efficiency, an auto-focusing performance, crosstalk, etc.

Figure 14:
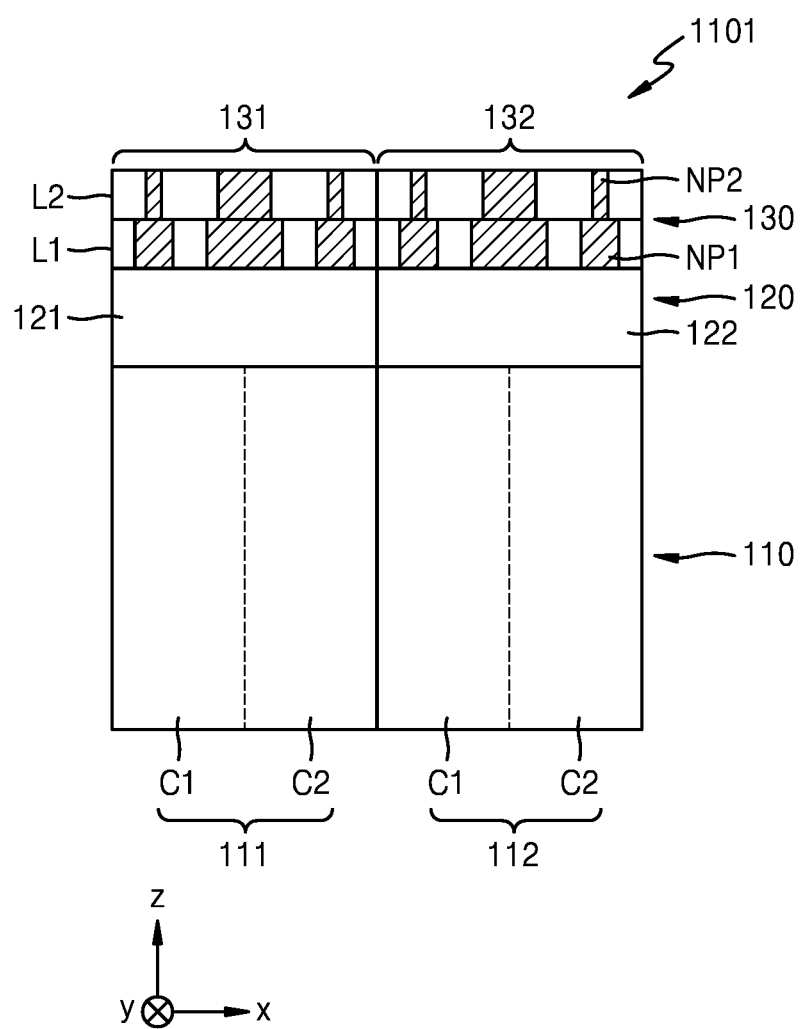
FIG. 14 is a cross-sectional view schematically showing a structure of a pixel array in an image sensor according to another example embodiment.

FIG. 14 is a cross-sectional view schematically showing a structure of a pixel array in an image sensor according to another example embodiment. Referring to FIG. 14, the nano-photonic microlens array 130 of a pixel array 1101 may have a multi-layered structure including two or more layers. For example, the nano-photonic microlens array 130 may include a first layer L1 and a second layer L2 stacked on the first layer L1. The first layer L1 may include a plurality of first nano-structures NP1. The second layer L2 may include a plurality of second nano-structures NP2. The plurality of second nano-structures NP2 may be stacked on the plurality of first nano-structures NP1 corresponding thereto. Widths or diameters of the plurality of second nano-structures NP2 may be equal to or different from widths or diameters of the first nano-structures NP1 corresponding thereto. For example, the width or diameter of the second nano-structure NP2 may be less than the width or diameter of the first nano-structure NP1 corresponding thereto. The plurality of first nano-structures NP1 and the plurality of second nano-structures NP2 may be arranged according to the arrangement rule described above with reference to FIG. 6.

Figure 15:
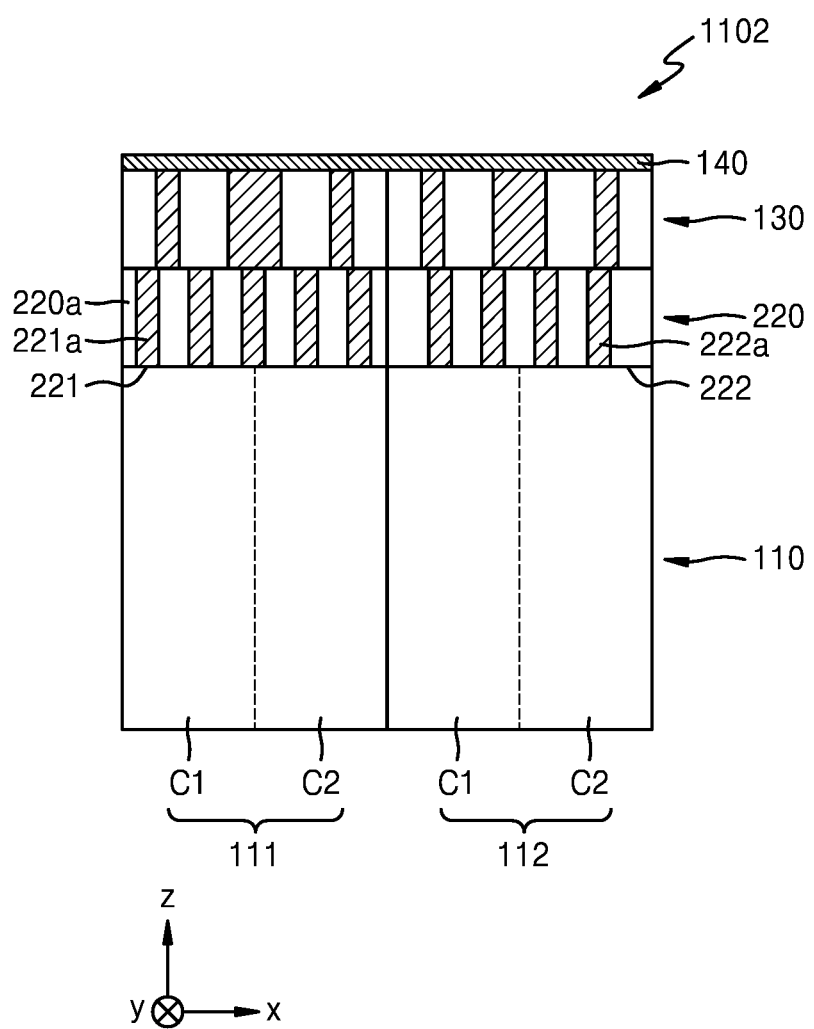
FIG. 15 is a cross-sectional view schematically showing a structure of a pixel array in an image sensor according to another example embodiment.

FIG. 15 is a cross-sectional view schematically showing a structure of a pixel array 1102 in an image sensor according to another example embodiment. Referring to FIG. 15, a pixel array 1102 may further include an anti-reflection layer 140 on a light-incident surface of the nano-photonic microlens array 130. The anti-reflection layer 140 may reduce the light reflected by the upper surface of the nano-photonic microlens array 130, and thus, may improve the light-utilization efficiency of the pixel array 1102. The anti-reflection layer 140 may include a single layer formed of a material having a refractive index that is different from that of the material included in the nano-structure of the nano-photonic microlens array 130, for example, one selected from $SiO_2$, $Si_3N_4$, and $Al_2O_3$. The anti-reflection layer 140 may have a thickness of about 80 nm to about 120 nm. Alternatively, the anti-reflection layer 140 may have a multi-layered structure in which different dielectric materials are alternately stacked. For example, the anti-reflection layer 140 may be formed by alternately stacking two or three of $SiO_2$, $Si_3N_4$, and $Al_2O_3$. Alternatively, the anti-reflection layer 140 may include various patterns for anti-reflection.

Also, the pixel array 1102 may include an inorganic color filter, instead of an organic color filter. For example, the pixel array 1102 may include an inorganic color filter layer 220 between the sensor substrate 110 and the nano-photonic microlens array 130. The inorganic color filter layer 220 may include a first inorganic color filter 221 arranged on the first pixel 111, and a second inorganic color filter 222 arranged on the second pixel 112. Although not shown in FIG. 15, the inorganic color filter layer 220 may further include a third inorganic color filter arranged on the third pixel 113, and a fourth inorganic color filter arranged on the fourth pixel 114.

The first inorganic color filter 221 may include, for example, a plurality of first nano-patterns 221a that are configured to transmit green light and absorb or reflect the light of other wavelength bands. The second inorganic color filter 222 may include, for example, a plurality of second nano-patterns 222a that are configured to transmit blue light and absorb or reflect the light of other wavelength bands. The first nano-patterns 221a may be arranged to have less width, interval, cycle, etc. than wavelength of the wavelength band of the green light, and the second nano-patterns 222a may be arranged to have less width, interval, cycle, etc. than wavelength of the wavelength band of the blue light. Also, the third inorganic color filter may include a plurality of third nano-patterns that are configured to transmit red light and absorb or reflect the light of other wavelength bands, and the fourth inorganic color filter may include a plurality of fourth nano-patterns that are configured to transmit green light and absorb or reflect the light of other wavelength bands. Also, the inorganic color filter layer 220 may further include a dielectric material 220a that surrounds the periphery of the first nano-patterns 221a and the periphery of the second nano-patterns 222a and has a refractive index less than that of the first nano-patterns 221a and the refractive index of the second nano-patterns 222a.

Figure 16:
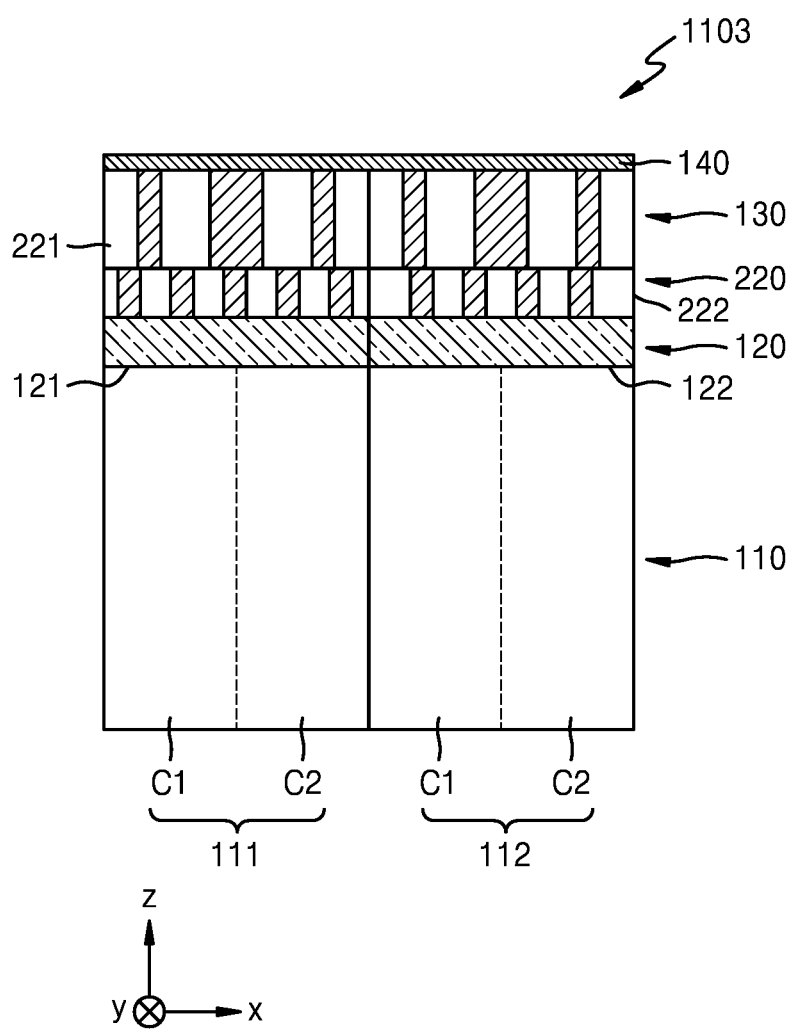
FIG. 16 is a cross-sectional view schematically showing a structure of a pixel array in an image sensor according to another example embodiment.

FIG. 16 is a cross-sectional view schematically showing a structure of a pixel array 1103 in an image sensor according to another example embodiment. Referring to FIG. 16, the pixel array 1103 may include the color filter layer 120 including a plurality of organic color filters and the inorganic color filter layer 220 including a plurality of inorganic color filters. FIG. 16 shows that the inorganic color filter layer 220 is arranged on the color filter layer 120, but the color filter layer 120 may be arranged on the inorganic color filter layer 220. In this case, the first color filter 121 and the first inorganic color filter 221 may form a first organic/inorganic hybrid color filter along with each other. Also, the second color filter 122 and the second inorganic color filter 222 may form a second organic/inorganic hybrid color filter along with each other.

Figure 17:
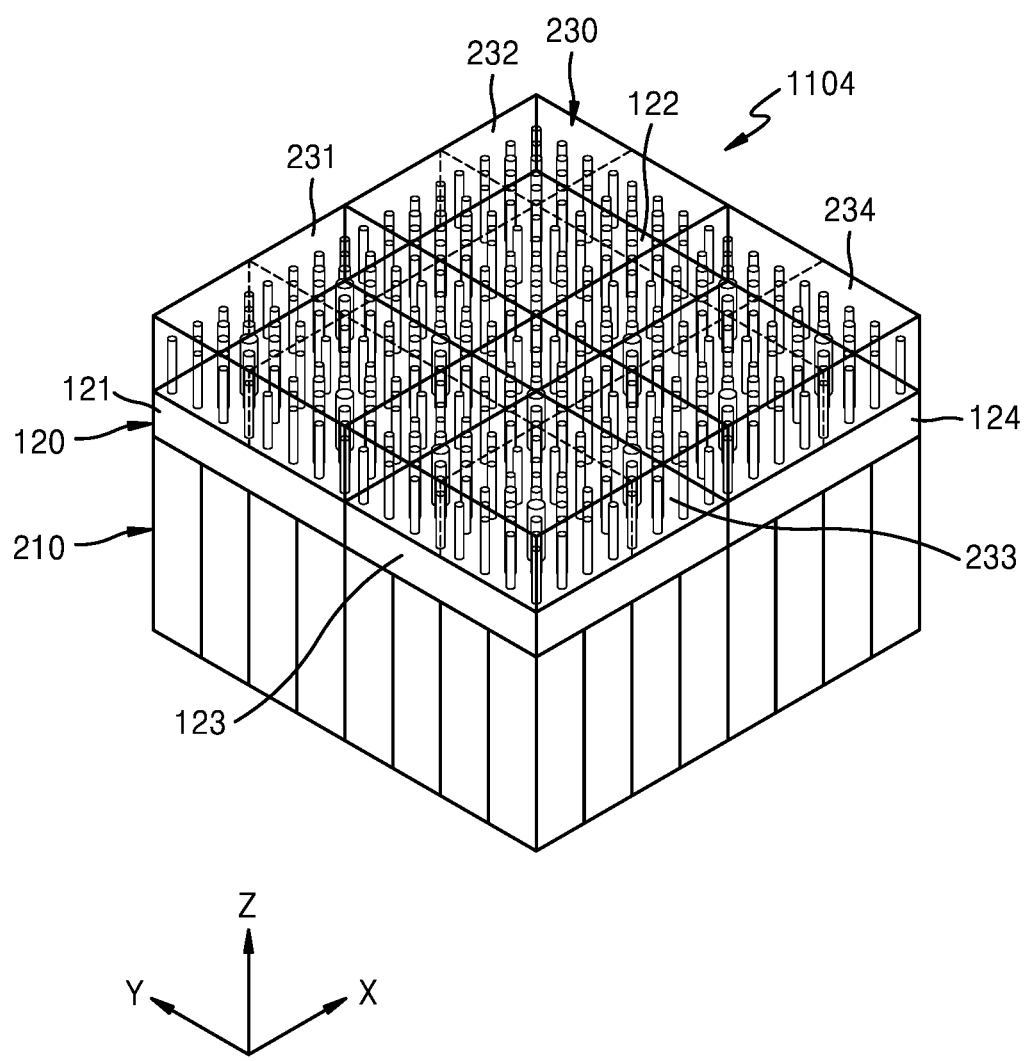
FIG. 17 is a perspective view schematically showing a structure of a pixel array in an image sensor according to another example embodiment.

FIG. 17 is a perspective view schematically showing a structure of a pixel array 1104 in an image sensor according to another example embodiment. Referring to FIG. 17, the pixel array 1100 may include a sensor substrate 210, a color filter layer 120 on the sensor substrate 210, and a nano-photonic microlens array 230 on the color filter layer 120.

Figure 18:
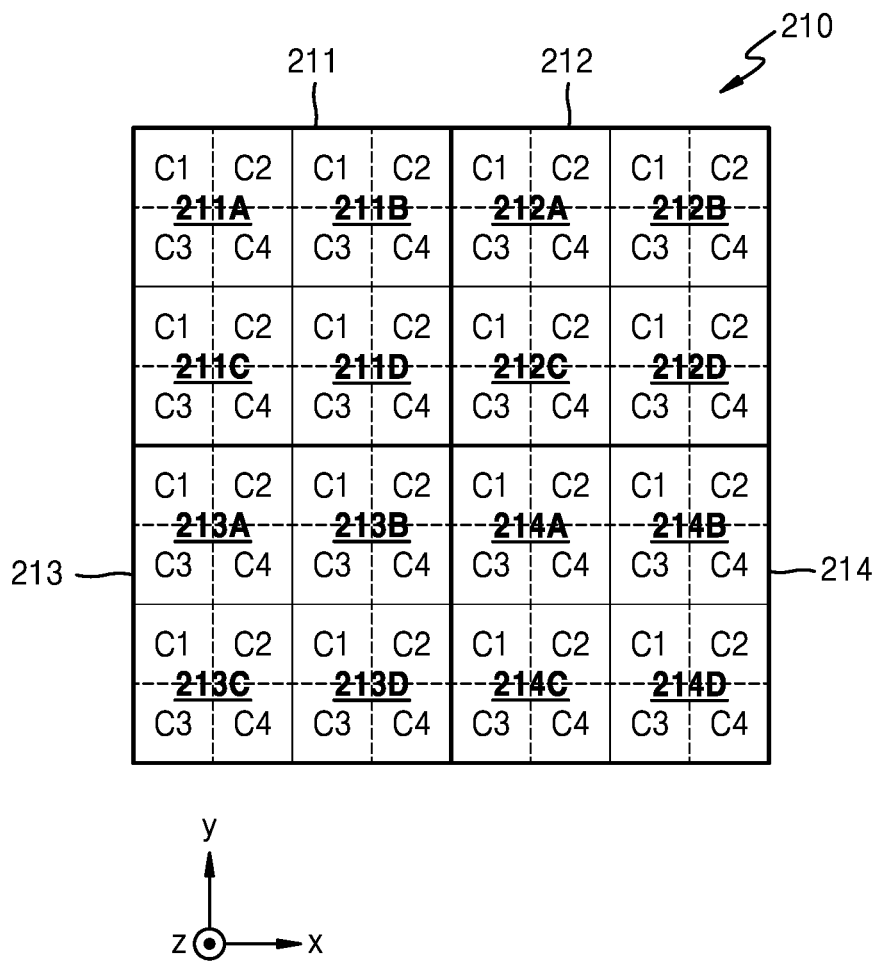
FIG. 18 is a plan view schematically showing a structure of a sensor substrate in the pixel array of FIG. 17.

FIG. 18 is a plan view schematically showing a structure of the sensor substrate 210 in the pixel array of FIG. 17.

Referring to FIG. 18, the sensor substrate 210 may include a first pixel 211, a second pixel 212, a third pixel 213, and a fourth pixel 214 that are arranged in the Bayer pattern type. For example, the first and fourth pixels 211 and 214 may be green pixels sensing green light, the second pixel 212 may be a blue pixel sensing blue light, and the third pixel 213 may be a red pixel sensing red light. Although FIG. 18 only shows one of each of the first to fourth pixels 211, 212, 213, and 214, a plurality of first to fourth pixels 211, 212, 213, and 214 may be two-dimensionally arranged in the Bayer pattern type.

The first to fourth pixels 211, 212, 213, and 214 may each include four sub-pixels that are independent from one another and arranged in 2×2 array. For example, the first pixel 211 may include a first sub-pixel 211A, a second sub-pixel 211B, a third sub-pixel 211C, and a fourth sub-pixel 211D. Also, the second pixel 212 may include a first sub-pixel 212A, a second sub-pixel 212B, a third sub-pixel 212C, and a fourth sub-pixel 212D, the third pixel 213 may include a first sub-pixel 213A, a second sub-pixel 213B, a third sub-pixel 213C, and a fourth sub-pixel 213D, and the fourth pixel 214 may include a first sub-pixel 214A, a second sub-pixel 214B, a third sub-pixel 214C, and a fourth sub-pixel 214D. Also, each of the plurality of sub-pixels 211A, 211B, 2110, 211D, 212A, 212B, 2120, 212D, 213A, 213B, 2130, 213D, 214A, 214B, 214C, and 214D may include a plurality of independent photosensitive cells that are arranged in 2×2 array, for example, first to fourth photosensitive cells c1, c2, c3, and c4. Each of the first to fourth pixels 211, 212, 213, and 214 may include four sub-pixels and 16 photosensitive cells.

Referring back to FIG. 17, the first color filter 121 is arranged facing the first pixel 211 corresponding thereto, the second color filter 122 is arranged facing the second pixel 212 corresponding thereto, the third color filter 123 is arranged facing the third pixel 213 corresponding thereto, and the fourth color filter 124 is arranged facing the fourth pixel 214 corresponding thereto. Therefore, the first color filter 121 may face the first to fourth sub-pixels 211A, 211B, 211C, and 211D of the first pixel 211, the second color filter 122 may face the first to fourth sub-pixels 212A, 212B, 212C, and 212D of the second pixel 212, the third color filter 123 may face the first to fourth sub-pixels 213A, 213B, 213C, and 213D of the third pixel 213, and the fourth color filter 124 may face the first to fourth sub-pixels 214A, 214B, 214C, and 214D of the fourth pixel 214.

Figure 19:
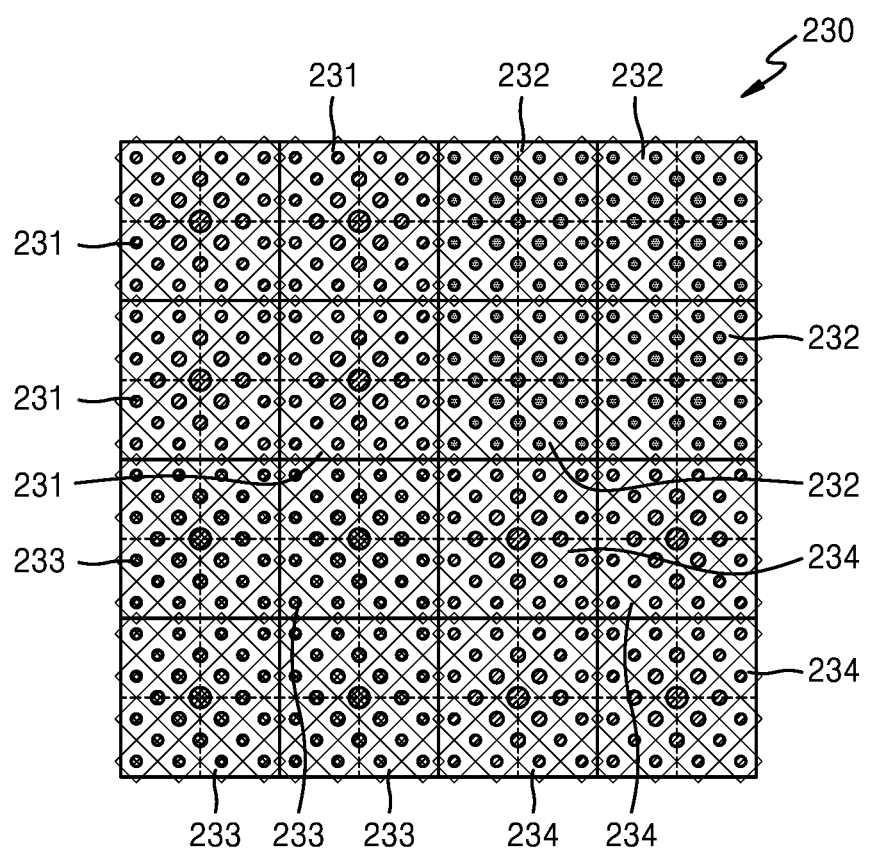
FIG. 19 is a plan view schematically showing a structure of a nano-photonic microlens array according to an example embodiment of FIG. 17.

FIG. 19 is a plan view schematically showing a structure of the nano-photonic microlens array 230 according to an example embodiment of FIG. 17. Referring to FIG. 19, the nano-photonic microlens array 230 may include a plurality of nano-photonic microlenses that correspond to the plurality of sub-pixels in one-to-one correspondence. For example, the nano-photonic microlens array 230 may include a plurality of first nano-photonic microlenses 231 that are arranged to respectively face the first to fourth sub-pixels 211A, 211B, 211C, and 211D of the first pixel 211, a plurality of second nano-photonic microlenses 232 that are arranged to respectively face the first to fourth sub-pixels 212A, 212B, 212C, and 212D of the second pixel 212, a plurality of third nano-photonic microlenses 233 that are arranged to respectively face the first to fourth sub-pixels 213A, 213B, 213C, and 213D of the third pixel 213, and a plurality of fourth nano-photonic microlenses 234 that are arranged to respectively face the first to fourth sub-pixels 214A, 214B, 214C, and 214D of the fourth pixel 214. Therefore, four first nano-photonic microlenses 231 that are arranged in 2×2 array are arranged with respect to one first pixel 211, four second nano-photonic microlenses 232 that are arranged in 2×2 array are arranged with respect to one second pixel 212, four third nano-photonic microlenses 233 that are arranged in 2×2 array are arranged with respect to one third pixel 213, and four fourth nano-photonic microlenses 234 that are arranged in 2×2 array are arranged with respect to one fourth pixel 214.

Also, each of the four first nano-photonic microlenses 231 may be arranged to face the first to fourth photosensitive cells c1, c2, c3, and c4 of one corresponding sub-pixel from among the first to fourth sub-pixels 211A, 211B, 211C, and 211D of the first pixel 211, each of the four second nano-photonic microlenses 232 may be arranged to face the first to fourth photosensitive cells c1, c2, c3, and c4 of one corresponding sub-pixel from among the first to fourth sub-pixels 212A, 212B, 212C, and 212D of the second pixel 212, each of the four third nano-photonic microlenses 233 may be arranged to face the first to fourth photosensitive cells c1, c2, c3, and c4 of one corresponding sub-pixel from among the first to fourth sub-pixels 213A, 213B, 213C, and 213D of the third pixel 213, and each of the four fourth nano-photonic microlenses 234 may be arranged to face the first to fourth photosensitive cells c1, c2, c3, and c4 of one corresponding sub-pixel from among the first to fourth sub-pixels 214A, 214B, 214C, and 214D of the fourth pixel 214.

Each of the four first nano-photonic microlenses 231 may have the same nano-pattern structure as that of the first nano-photonic microlens 131 shown in FIG. 5, each of the four second nano-photonic microlenses 232 may have the same nano-pattern structure as that of the second nano-photonic microlens 132 shown in FIG. 5, each of the four third nano-photonic microlenses 233 may have the same nano-pattern structure as that of the third nano-photonic microlens 133 shown in FIG. 5, and each of the four fourth nano-photonic microlenses 234 may have the same nano-pattern structure as that of the fourth nano-photonic microlens 134 shown in FIG. 5.

Therefore, each of the four first nano-photonic microlenses 231 may be configured to condense the incident light to one corresponding sub-pixel from among the first to fourth sub-pixels 211A, 211B, 211C, and 211D of the first pixel 211. Then, the focusing spot formed by each of the four first nano-photonic microlenses 231 may be located at the center of 2×2 array including the first to fourth photosensitive cells c1, c2, c3, and c4 of the corresponding sub-pixel. Also, each of four second nano-photonic microlenses 232 may be provided to condense the incident light to corresponding sub-pixel from among the first to fourth sub-pixels 212A, 212B, 212C, and 212D of the second pixel 212. The focusing spot formed by each of the four second nano-photonic microlenses 232 may be located at the center of 2×2 array including the first to fourth photosensitive cells c1, c2, c3, and c4 of the corresponding sub-pixel. Each of four third nano-photonic microlenses 233 may be provided to condense the incident light to corresponding sub-pixel from among the first to fourth sub-pixels 213A, 213B, 213C, and 213D of the third pixel 213. The focusing spot formed by each of the four third nano-photonic microlenses 233 may be located at the center of 2×2 array including the first to fourth photosensitive cells c1, c2, c3, and c4 of the corresponding sub-pixel. Each of four fourth nano-photonic microlenses 234 may be provided to condense the incident light to corresponding sub-pixel from among the first to fourth sub-pixels 214A, 214B, 214C, and 214D of the fourth pixel 214. The focusing spot formed by each of the four fourth nano-photonic microlenses 234 may be located at the center of 2×2 array including the first to fourth photosensitive cells c1, c2, c3, and c4 of the corresponding sub-pixel.

Figure 20:
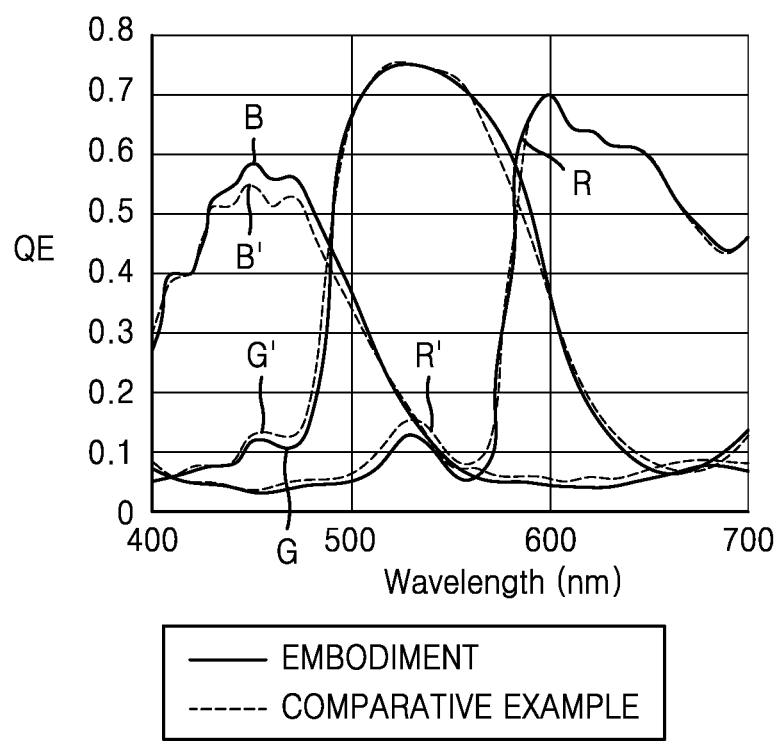
FIG. 20 is a graph for comparing the quantum efficiency of an image sensor including the nano-photonic microlens array of FIG. 19 according to the example embodiment with the quantum efficiency of an image sensor according to a comparative example.

FIG. 20 is a graph for comparing the quantum efficiency of an image sensor including the nano-photonic microlens array of FIG. 19 according to the example embodiment with the quantum efficiency of an image sensor according to a comparative example. The image sensor according to the comparative example includes the sensor substrate 210 shown in FIG. 18. In the image sensor, the first nano-photonic microlens 11 shown in FIG. 10 is arranged with respect to each of the plurality of sub-pixels 211A, 211B, 211C, and 211D in the first pixel 211, the second nano-photonic microlens 12 shown in FIG. 10 is arranged with respect to the first to fourth sub-pixels 212A, 212B, 212C, and 212D of the second pixel 212, the third nano-photonic microlens 13 shown in FIG. 10 is arranged with respect to each of the first to fourth sub-pixels 213A, 213B, 213C, and 213D of the third pixel 213, and the fourth nano-photonic microlens 14 shown in FIG. 10 is arranged with respect to each of the first to fourth sub-pixels 214A, 214B, 214C, and 214D of the fourth pixel 214.

In FIG. 20, graphs indicated as B', G', and R' represent a quantum efficiency of the image sensor according to the comparative example with respect to the blue light, green light, and red light, and graphs indicated as B, G, and R represent a quantum efficiency of the image sensor according to the example embodiment with respect to the blue light, green light, and red light. Referring to FIG. 20, the image sensor according to the example embodiment may have an improved quantum efficiency in the blue light region as compared with the image sensor according to the comparative example, and may have entirely reduced crosstalk. Therefore, the accuracy of the auto-focusing function implemented by comparing output signals from adjacent photosensitive cells may be improved.

The image sensor according to the example embodiment may form a camera module along with a module lens of various functions and may be utilized in various electronic devices.

Figure 21:
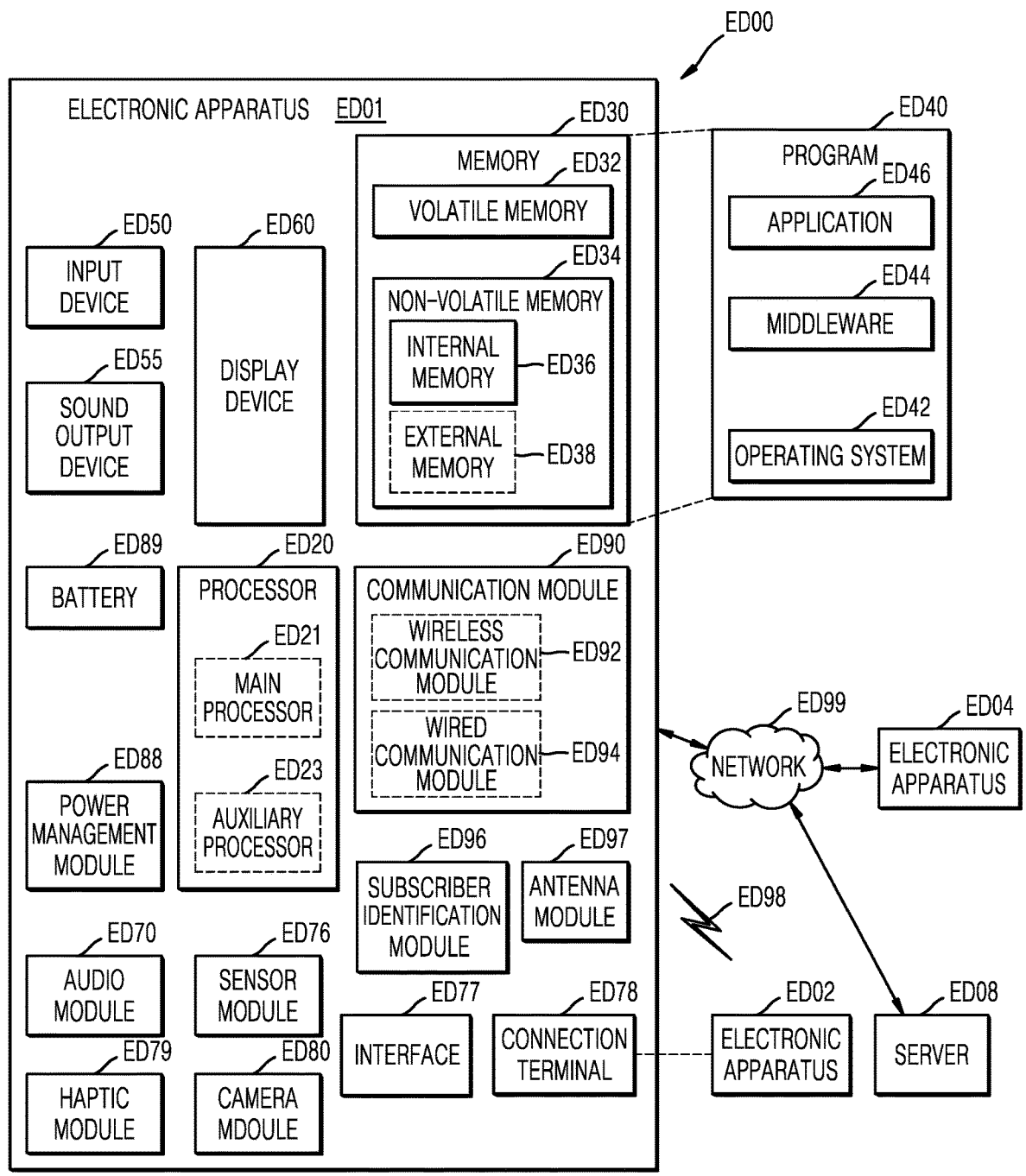
FIG. 21 is a block diagram of an electronic device including an image sensor according to one or more example embodiments.

FIG. 21 is a block diagram showing an example of an electronic apparatus ED01 including an image sensor 1000. Referring to FIG. 21, in a network environment ED00, the electronic apparatus ED01 may communicate with another electronic apparatus ED02 via a first network ED98 (short-range wireless communication network, etc.), or may communicate with another electronic apparatus ED04 and/or a server ED08 via a second network ED99 (long-range wireless communication network, etc.) The electronic apparatus ED01 may communicate with the electronic apparatus ED04 via the server ED08. The electronic apparatus ED01 may include a processor ED20, a memory ED30, an input device ED50, a sound output device ED55, a display device ED60, an audio module ED70, a sensor module ED76, an interface ED77, a haptic module ED79, a camera module ED80, a power management module ED88, a battery ED89, a communication module ED90, a subscriber identification module ED96, and/or an antenna module ED97. In the electronic apparatus ED01, some (display device ED60, etc.) of the elements may be omitted or another element may be added. Some of the elements may be configured as one integrated circuit. For example, the sensor module ED76 (a fingerprint sensor, an iris sensor, an illuminance sensor, etc.) may be embedded and implemented in the display device ED60 (display, etc.).

The processor ED20 may control one or more elements (hardware, software elements, etc.) of the electronic apparatus ED01 connected to the processor ED20 by executing software (program ED40, etc.), and may perform various data processes or operations. As a part of the data processing or operations, the processor ED20 may load a command and/or data received from another element (sensor module ED76, communication module ED90, etc.) to a volatile memory ED32, may process the command and/or data stored in the volatile memory ED32, and may store result data in a non-volatile memory ED34. The processor ED20 may include a main processor ED21 (central processing unit, application processor, etc.) and an auxiliary processor ED23 (graphic processing unit, image signal processor, sensor hub processor, communication processor, etc.) that may be operated independently from or along with the main processor ED21. The auxiliary processor ED23 may use less power than that of the main processor ED21, and may perform specified functions.

The auxiliary processor ED23, on behalf of the main processor ED21 while the main processor ED21 is in an inactive state (sleep state) or along with the main processor ED21 while the main processor ED21 is in an active state (application executed state), may control functions and/or states related to some (display device ED60, sensor module ED76, communication module ED90, etc.) of the elements in the electronic apparatus ED01. The auxiliary processor ED23 (image signal processor, communication processor, etc.) may be implemented as a part of another element (camera module ED80, communication module ED90, etc.) that is functionally related thereto.

The memory ED30 may store various data required by the elements (processor ED20, sensor module ED76, etc.) of the electronic apparatus ED01. The data may include, for example, input data and/or output data about software (program ED40, etc.) and commands related thereto. The memory ED30 may include the volatile memory ED32 and/or the non-volatile memory ED34.

The program ED40 may be stored as software in the memory ED30, and may include an operation system ED42, middleware ED44, and/or an application ED46.

The input device ED50 may receive commands and/or data to be used in the elements (processor ED20, etc.) of the electronic apparatus ED01, from outside (user, etc.) of the electronic apparatus ED01. The input device ED50 may include a microphone, a mouse, a keyboard, and/or a digital pen (stylus pen).

The sound output device ED55 may output a sound signal to outside of the electronic apparatus ED01. The sound output device ED55 may include a speaker and/or a receiver. The speaker may be used for a general purpose such as multimedia reproduction or record play, and the receiver may be used to receive a call. The receiver may be coupled as a part of the speaker or may be implemented as an independent device.

The display device ED60 may provide visual information to outside of the electronic apparatus ED01. The display device ED60 may include a display, a hologram device, or a projector, and a control circuit for controlling the corresponding device. The display device ED60 may include a touch circuitry set to sense a touch, and/or a sensor circuit (pressure sensor, etc.) that is set to measure a strength of a force generated by the touch.

The audio module ED70 may convert sound into an electrical signal or vice versa. The audio module ED 70 may acquire sound through the input device ED50, or may output sound via the sound output device ED55 and/or a speaker and/or a headphone of another electronic apparatus (electronic apparatus ED02, etc.) connected directly or wirelessly to the electronic apparatus ED01.

The sensor module ED76 may sense an operating state (power, temperature, etc.) of the electronic apparatus ED01, or an outer environmental state (user state, etc.), and may generate an electrical signal and/or data value corresponding to the sensed state. The sensor module ED76 may include a gesture sensor, a gyro-sensor, a pressure sensor, a magnetic sensor, an acceleration sensor, a grip sensor, a proximity sensor, a color sensor, an infrared (IR) ray sensor, a vivo sensor, a temperature sensor, a humidity sensor, and/or an illuminance sensor.

The interface ED77 may support one or more designated protocols that may be used in order for the electronic apparatus ED01 to be directly or wirelessly connected to another electronic apparatus (electronic apparatus ED02, etc.) The interface ED77 may include a high-definition multimedia interface (HDMI), a universal serial bus (USB) interface, an SD card interface, and/or an audio interface.

The connection terminal ED78 may include a connector by which the electronic apparatus ED01 may be physically connected to another electronic apparatus (electronic apparatus ED02, etc.). The connection terminal ED78 may include an HDMI connector, a USB connector, an SD card connector, and/or an audio connector (headphone connector, etc.).

The haptic module ED79 may convert the electrical signal into a mechanical stimulation (vibration, motion, etc.) or an electric stimulation that the user may sense through a tactile or motion sensation. The haptic module ED79 may include a motor, a piezoelectric device, and/or an electric stimulus device.

The camera module ED80 may capture a still image and a video. The camera module ED80 may include a lens assembly including one or more lenses, the image sensor 1000 of FIG. 1, image signal processors, and/or flashes. The lens assembly included in the camera module ED80 may collect light emitted from an object that is an object to be captured.

The power management module ED88 may manage the power supplied to the electronic apparatus ED01. The power management module ED88 may be implemented as a part of a power management integrated circuit (PMIC).

The battery ED89 may supply electric power to components of the electronic apparatus ED01. The battery ED89 may include a primary battery that is not rechargeable, a secondary battery that is rechargeable, and/or a fuel cell.

The communication module ED90 may support the establishment of a direct (wired) communication channel and/or a wireless communication channel between the electronic apparatus ED01 and another electronic apparatus (electronic apparatus ED02, electronic apparatus ED04, server ED08, etc.), and execution of communication through the established communication channel. The communication module ED90 may be operated independently from the processor ED20 (application processor, etc.), and may include one or more communication processors that support the direct communication and/or the wireless communication. The communication module ED90 may include a wireless communication module ED92 (cellular communication module, a short-range wireless communication module, a global navigation satellite system (GNSS) communication module) and/or a wired communication module ED94 (local area network (LAN) communication module, a power line communication module, etc.). From among the communication modules, a corresponding communication module may communicate with another electronic apparatus via a first network ED09 (short-range communication network such as Bluetooth, WiFi direct, or infrared data association (IrDA)) or a second network ED99 (long-range communication network such as a cellular network, Internet, or computer network (LAN, WAN, etc.)). Such above various kinds of communication modules may be integrated as one element (single chip, etc.) or may be implemented as a plurality of elements (a plurality of chips) separately from one another. The wireless communication module ED92 may identify and authenticate the electronic apparatus ED01 in a communication network such as the first network ED98 and/or the second network ED99 by using subscriber information (international mobile subscriber identifier (IMSI), etc.) stored in the subscriber identification module ED96.

The antenna module ED97 may transmit or receive the signal and/or power to/from outside (another electronic apparatus, etc.). An antenna may include a radiator formed as a conductive pattern formed on a substrate (PCB, etc.). The antenna module ED97 may include one or more antennas. When the antenna module ED97 includes a plurality of antennas, from among the plurality of antennas, an antenna that is suitable for the communication type used in the communication network such as the first network ED98 and/or the second network ED99 may be selected by the communication module ED90. The signal and/or the power may be transmitted between the communication module ED90 and another electronic apparatus via the selected antenna. Another component (RFIC, etc.) other than the antenna may be included as a part of the antenna module ED97.

Some of the elements may be connected to one another via the communication method among the peripheral devices (bus, general purpose input and output (GPIO), serial peripheral interface (SPI), mobile industry processor interface (MIPI), etc.) and may exchange signals (commands, data, etc.).

The command or data may be transmitted or received between the electronic apparatus ED01 and the external electronic apparatus ED04 via the server ED08 connected to the second network ED99. Other electronic apparatuses ED02 and ED04 may be the devices that are the same as or different kinds from the electronic apparatus ED01. All or some of the operations executed in the electronic apparatus ED01 may be executed in one or more devices among the other electronic apparatuses ED02, ED04, and ED08. For example, when the electronic apparatus ED01 has to perform a certain function or service, the electronic apparatus ED01 may request one or more other electronic apparatuses to perform some or entire function or service, instead of executing the function or service by itself. One or more electronic apparatuses receiving the request execute an additional function or service related to the request and may transfer a result of the execution to the electronic apparatus ED01. To do this, for example, a cloud computing, a distributed computing, or a client-server computing technique may be used.

Figure 22:
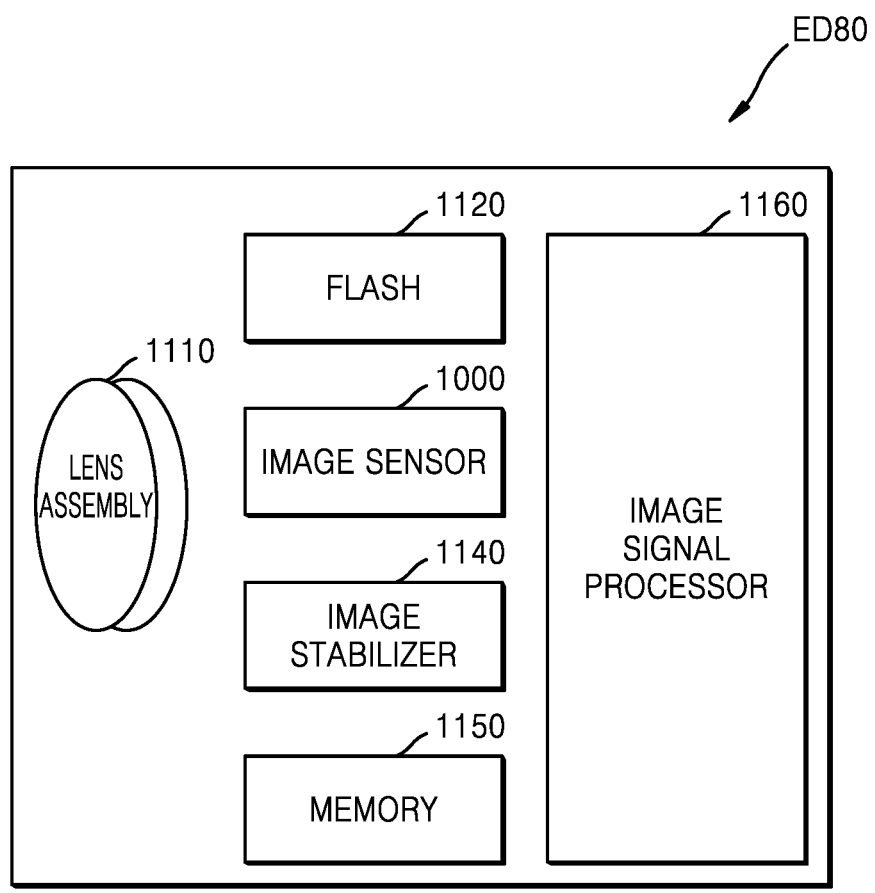
FIG. 22 is a block diagram schematically showing a camera module in FIG. 21.

FIG. 22 is a block diagram showing an example of the camera module ED80 included in the electronic apparatus ED01 of FIG. 21. Referring to FIG. 22, the camera module ED80 may include a lens assembly 1110, a flash 1120, an image sensor 1000, an image stabilizer 1140, a memory 1150 (buffer memory, etc.), and/or an image signal processor 1160. The lens assembly 1110 may collect light emitted from an object that is to be captured. The camera module ED80 may include a plurality of lens assemblies 1110, and in this case, the camera module ED80 may include a dual camera module, a 360-degree camera, or a spherical camera. Some of the plurality of lens assemblies 1110 may have the same lens properties (viewing angle, focal distance, auto-focus, F number, optical zoom, etc.) or different lens properties. The lens assembly 1110 may include a wide-angle lens or a telephoto lens.

The flash 1120 may emit light that is used to strengthen the light emitted or reflected from the object. The flash 1120 may emit visible light or infrared-ray light. The flash 1120 may include one or more light-emitting diodes (red-green-blue (RGB) LED, white LED, infrared LED, ultraviolet LED, etc.), and/or a Xenon lamp. The image sensor 1000 may be the image sensor described above with reference to FIG. 1, and converts the light emitted or reflected from the object and transferred through the lens assembly 1110 into an electrical signal to obtain an image corresponding to the object.

The image stabilizer 1140, in response to a motion of the camera module ED80 or the electronic apparatus 1101 including the camera module ED80, moves one or more lenses included in the lens assembly 1110 or the image sensor 1000 in a certain direction or controls the operating characteristics of the image sensor 1000 (adjusting of a read-out timing, etc.) in order to compensate for a negative influence of the motion. The image stabilizer 1140 may sense the movement of the camera module ED80 or the electronic apparatus ED01 by using a gyro sensor (not shown) or an acceleration sensor (not shown) arranged in or out of the camera module ED80. The image stabilizer 1140 may be implemented as an optical type.

The memory 1150 may store some or entire data of the image obtained through the image sensor 1000 for next image processing operation. For example, when a plurality of images are obtained at a high speed, obtained original data (Bayer-patterned data, high resolution data, etc.) is stored in the memory 1150, and a low resolution image is only displayed. Then, original data of a selected image (user selection, etc.) may be transferred to the image signal processor 1160. The memory 1150 may be integrated with the memory ED30 of the electronic apparatus ED01, or may include an additional memory that is operated independently.

The image signal processor 1160 may perform image treatment on the image obtained through the image sensor 1000 or the image data stored in the memory 1150. The image treatments may include a depth map generation, a three-dimensional modeling, a panorama generation, extraction of features, an image combination, and/or an image compensation (noise reduction, resolution adjustment, brightness adjustment, blurring, sharpening, softening, etc.). The image signal processor 1160 may perform controlling (exposure time control, read-out timing control, etc.) of the elements (image sensor 1000, etc.) included in the camera module ED80. The image processed by the image signal processor 1160 may be stored again in the memory 1150 for additional process, or may be provided to an external element of the camera module ED80 (e.g., the memory ED30, the display device ED60, the electronic apparatus ED02, the electronic apparatus ED04, the server ED08, etc.). The image signal processor 1160 may be integrated with the processor ED20, or may be configured as an additional processor that is independently operated from the processor ED20. When the image signal processor 1160 is configured as an additional processor separately from the processor ED20, the image processed by the image signal processor 1160 undergoes through an additional image treatment by the processor ED20 and then may be displayed on the display device ED60.

Also, the image signal processor 1160 may receive two output signals independently from the adjacent photosensitive cells in each pixel or sub-pixel of the image sensor 1000, and may generate an auto-focusing signal from a difference between the two output signals. The image signal processor 1160 may control the lens assembly 1110 so that the focus of the lens assembly 1110 may be accurately formed on the surface of the image sensor 1000 based on the auto-focusing signal.

The electronic apparatus ED01 may further include one or a plurality of camera modules having different properties or functions. The camera module may include elements similar to those of the camera module ED80 of FIG. 22, and the image sensor included in the camera module may be implemented as a charge coupled device (CCD) sensor and/or a complementary metal oxide semiconductor (CMOS) sensor and may include one or a plurality of sensors selected from the image sensors having different properties, such as an RGB sensor, a black and white (BW) sensor, an IR sensor, or a UV sensor. In this case, one of the plurality of camera modules ED80 may include a wide-angle camera and another camera module ED80 may include a telephoto camera. Similarly, one of the plurality of camera modules ED80 may include a front camera and another camera module ED80 may include a rear camera.

Figure 23:
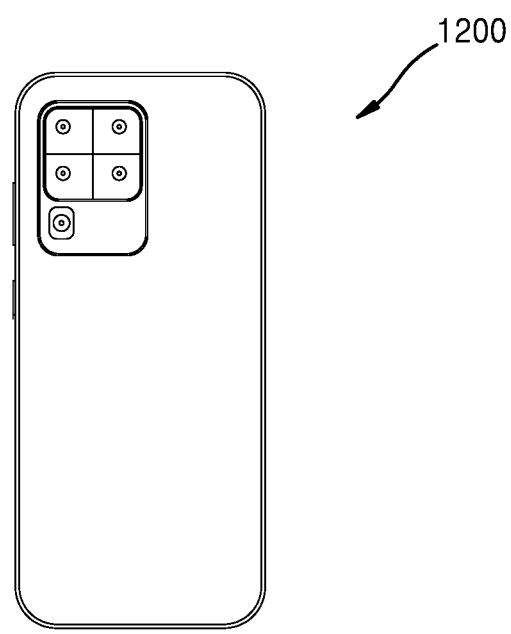
FIGS. 23 to 32 are diagrams showing various examples of an electronic apparatus including an image sensor according to one or more example embodiments.
Figure 24:
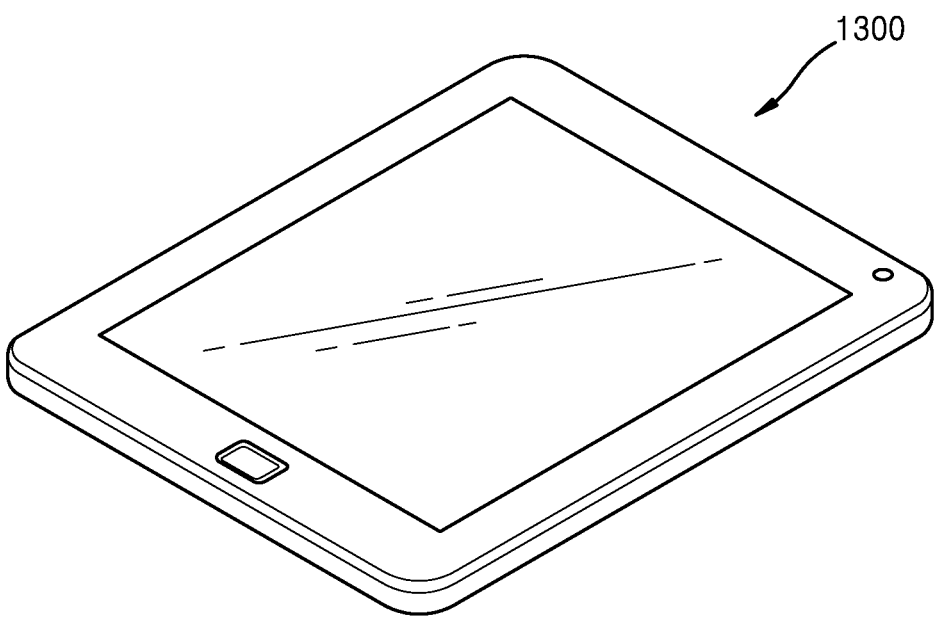
Figure 25:
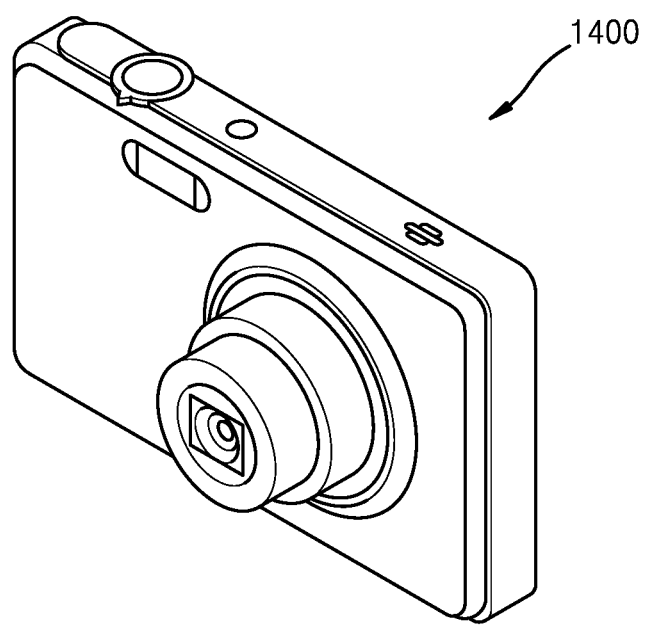
Figure 26:
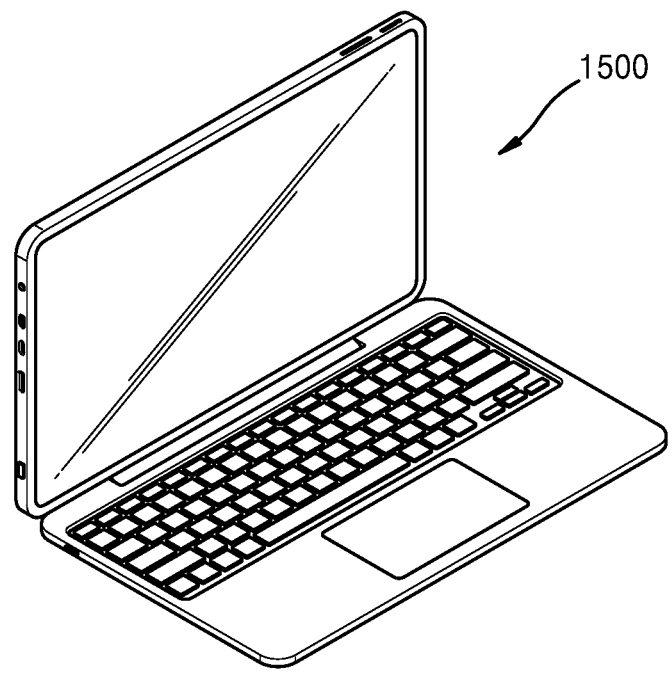
Figure 27:
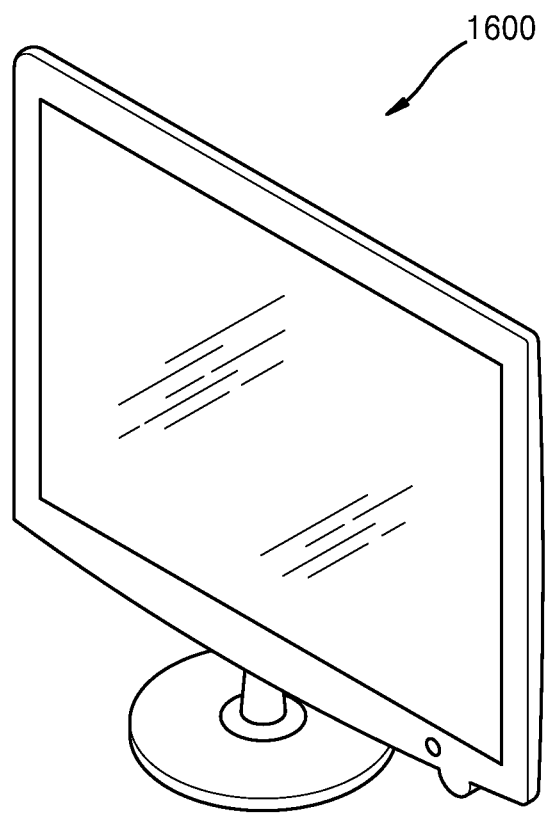

The image sensor 1000 according to the example embodiments may be applied to a mobile phone or a smartphone 1200 shown in FIG. 23, a tablet or a smart tablet 1300 shown in FIG. 24, a digital camera or a camcorder 1400 shown in FIG. 25, a laptop computer 1500 shown in FIG. 26, or a television or a smart television 1600 shown in FIG. 27. For example, the smartphone 1200 or the smart tablet 1300 may include a plurality of high-resolution cameras each including a high-resolution image sensor. Depth information of objects in an image may be extracted, out focusing of the image may be adjusted, or objects in the image may be automatically identified by using the high-resolution cameras.

Figure 28:
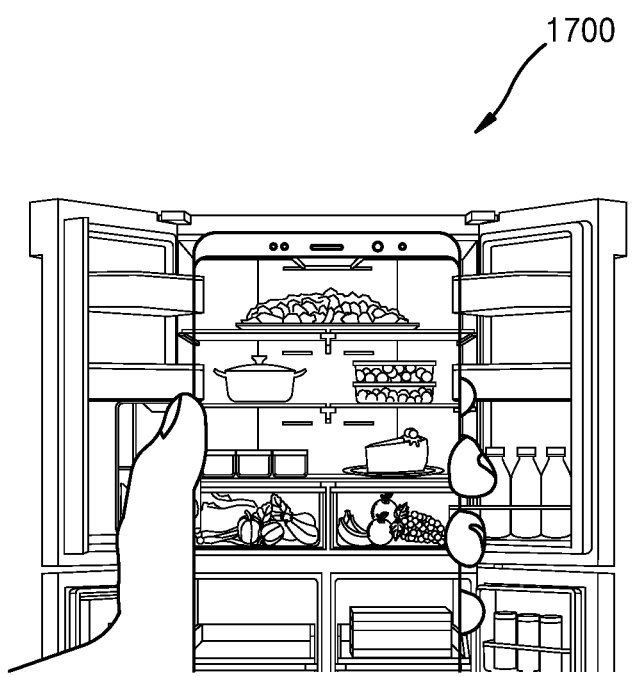
Figure 29:
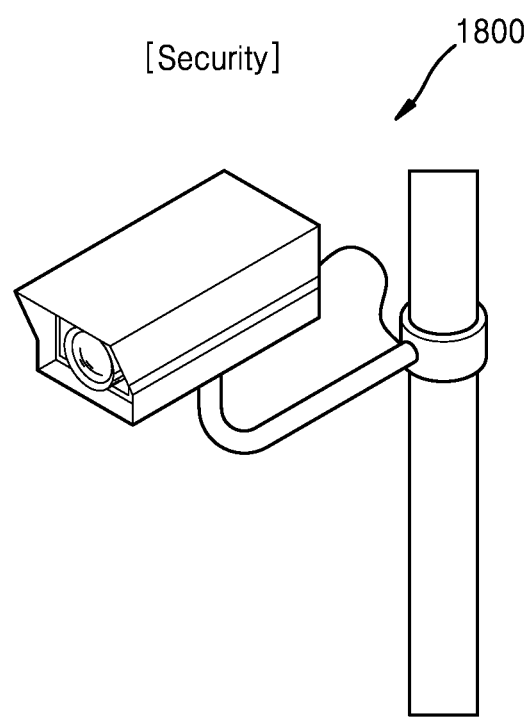
Figure 30:
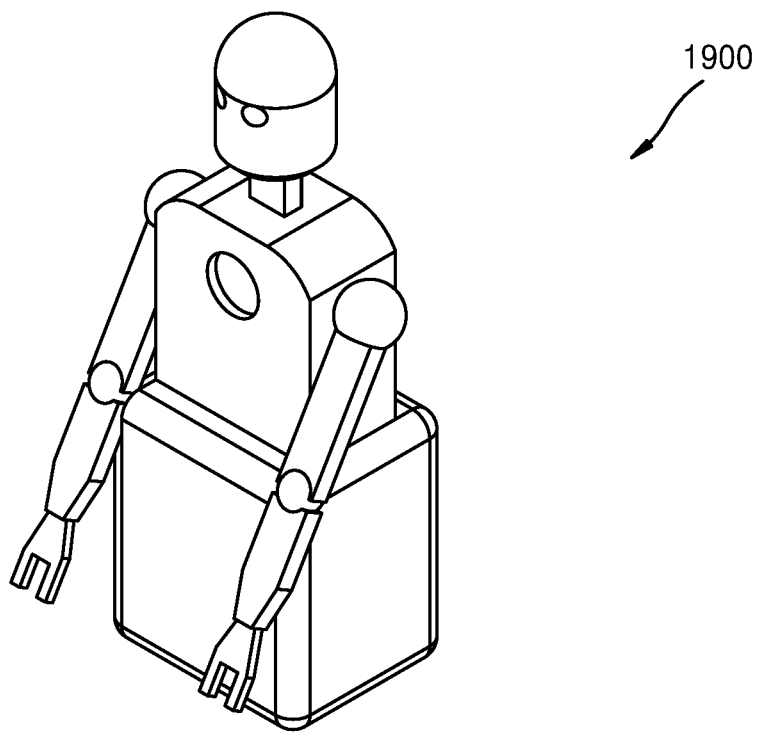
Figure 31:
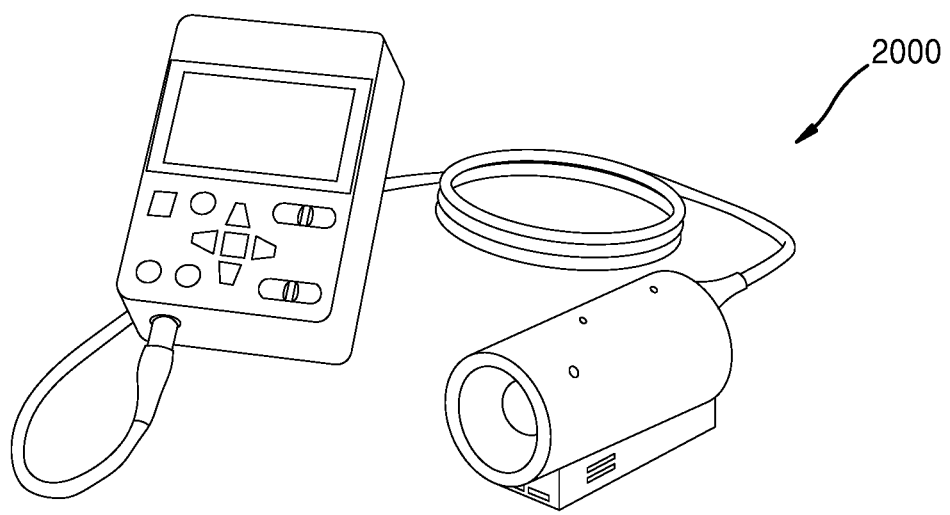

Also, the image sensor 1000 may be applied to a smart refrigerator 1700 shown in FIG. 28, a surveillance camera 1800 shown in FIG. 29, a robot 1900 shown in FIG. 30, a medical camera 2000 shown in FIG. 31, etc. For example, the smart refrigerator 1700 may automatically recognize food in the refrigerator by using the image sensor, and may notify the user of an existence of a certain kind of food, kinds of food put into or taken out, etc. through a smartphone. Also, the surveillance camera 1800 may provide an ultra-high-resolution image and may allow the user to recognize an object or a person in the image even in dark environment by using high sensitivity. The robot 1900 may be input to a disaster or industrial site that a person may not directly access, to provide the user with high-resolution images. The medical camera 2000 may provide high-resolution images for diagnosis or surgery, and may dynamically adjust a field of view.

Figure 32:
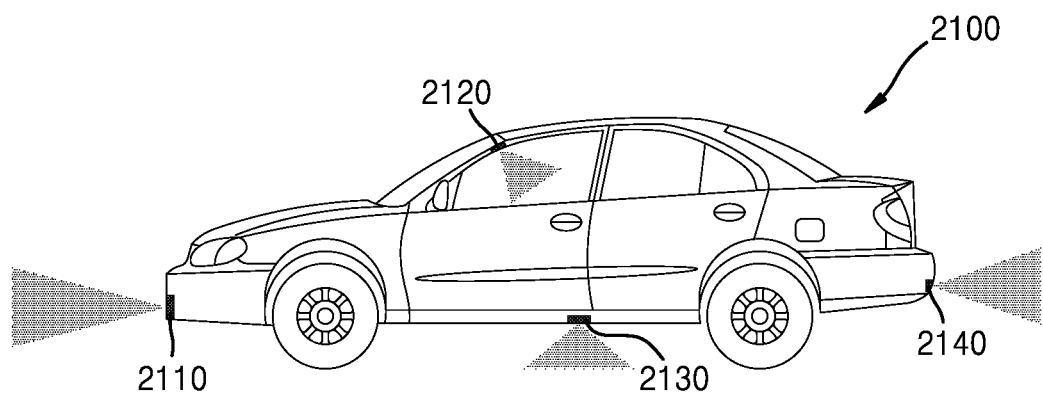

Also, the image sensor 1000 may be applied to a vehicle 2100 as shown in FIG. 32. The vehicle 2100 may include a plurality of vehicle cameras 2110, 2120, 2130, and 2140 at various locations. Each of the vehicle cameras 2110, 2120, 2130, and 2140 may include the image sensor according to the one or more example embodiments. The vehicle 2100 may provide a driver with various information about the interior of the vehicle 2100 or the periphery of the vehicle 2000 by using the plurality of vehicle cameras 2110, 2120, 2130, and 2140, and may provide the driver with the information necessary for the autonomous travel by automatically recognizing an object or a person in the image.

While the image sensor including the nano-photonic microlens array and the electronic apparats including the image sensor have been particularly shown and described with reference to exemplary embodiments thereof, it will be understood by those of ordinary skill in the art that various changes in form and details may be made therein without departing from the spirit and scope as defined by the following claims. The preferred embodiments should be considered in descriptive sense only and not for purposes of limitation. Therefore, the scope of the disclosure is defined not by the detailed description of the disclosure but by the appended claims, and all differences within the scope will be construed as being included in the present disclosure.

It should be understood that embodiments described herein should be considered in a descriptive sense only and not for purposes of limitation. Descriptions of features or aspects within each embodiment should typically be considered as available for other similar features or aspects in other embodiments. While one or more example embodiments have been described with reference to the figures, it will be understood by those of ordinary skill in the art that various changes in form and details may be made therein without departing from the spirit and scope as defined by the following claims.

What is claimed is:

1. An image sensor comprising:
a sensor substrate comprising a plurality of pixels configured to sense incident light; and
a nano-photonic microlens array arranged to face a light incident surface of the sensor substrate, the nano-photonic microlens array comprising a plurality of nano-photonic microlenses configured to condense the incident light,
wherein each pixel of the plurality of pixels comprises:
a plurality of photosensitive cells that are two-dimensionally arranged in a first direction and a second direction perpendicular to the first direction and are configured to independently sense the incident light, and
a first isolation structure extending in the first direction and a second isolation structure extending in the second direction, the first isolation structure and the second isolation structure configured to electrically isolate the plurality of photosensitive cells from each other,
wherein each nano-photonic microlens of the plurality of nano-photonic microlenses comprises a plurality of nano-structures that are configured to output light having a convex phase profile,
wherein the plurality of nano-structures are arranged in a two-dimensional array in a first diagonal direction between the first direction and the second direction and in a second diagonal direction crossing the first diagonal direction, and
wherein a first interval between two nano-structures that are adjacent to each other in the first direction or the second direction, among the plurality of nano-structures, is greater than or equal to a second interval between two nano-structures that are adjacent to each other in the first diagonal direction or the second diagonal direction, among the plurality of nano-structures.

2. The image sensor of claim 1, wherein a first arrangement period of the plurality of nano-structures arranged in the first direction or the second direction is greater than or equal to a second arrangement period of the plurality of nano-structures arranged in the first diagonal direction or the second diagonal direction.

3. The image sensor of claim 1, wherein each nano-structure of the plurality of nano-structures arranged in each nano-photonic microlens of the plurality of nano-photonic microlenses has a width or a diameter such that a phase of the light after passing through a center portion of each nano-photonic microlenses is largest and is reduced away from the center portion of each nano-photonic microlens.

4. The image sensor of claim 3, wherein a nano-structure arranged at the center portion of each nano-photonic microlens faces, in a vertical direction, a cross point between the first isolation structure extending in the first direction and the second isolation structure extending in the second direction.

5. The image sensor of claim 3, wherein a nano-structure that is closest to the nano-structure arranged at the center portion of each nano-photonic microlens is arranged so as not to face the first and the second isolation structures in a vertical direction.

6. The image sensor of claim 3, wherein, from among the plurality of nano-structures arranged in each nano-photonic microlens, nano-structures having same widths or same diameters are arranged in the form of a rectangle inclined in the first diagonal direction or the second diagonal direction and surround other nano-structures.

7. The image sensor of claim 3, wherein the light after passing through each nano-photonic microlens has a phase profile formed as a rectangle inclined in the first diagonal direction or the second diagonal direction.

8. The image sensor of claim 3, wherein a minimum value of the phase of the light after passing through each nano-photonic microlens, on a cross-section passing through the center portion of each nano-photonic microlens in the first direction, is greater than a minimum value of the phase of light after passing through each nano-photonic microlens on a cross-section passing an edge of each nano-photonic microlens in the first direction.

9. The image sensor of claim 1, wherein the plurality of nano-photonic microlenses correspond to the plurality of pixels in a one-to-one correspondence, and each nano-photonic microlens of the plurality of nano-photonic microlenses is arranged to condense incident light to one pixel from among the plurality of pixels corresponding to the respective nano-photonic microlenses.

10. The image sensor of claim 9, wherein, in each pixel of the plurality of pixels, the plurality of photosensitive cells are arranged in a 2×2 array, each nano-photonic microlens of the plurality of nano-photonic microlenses is arranged to face the plurality of photosensitive cells arranged in the 2×2 array, and a focusing spot formed by each of the plurality of nano-photonic microlenses is located at a center of the 2×2 array.

11. The image sensor of claim 1, wherein each pixel of the plurality of pixels includes four sub-pixels arranged in a 2×2 array, and the plurality of photosensitive cells are arranged in a 2×2 array in each sub-pixel of the four sub-pixels.

12. The image sensor of claim 11, wherein the plurality of nano-photonic microlenses correspond to the four sub-pixels in a one-to-one correspondence, each nano-photonic microlens of the plurality of nano-photonic microlenses is arranged to face the plurality of photosensitive cells that are arranged in the 2×2 array so as to condense incident light to a corresponding sub-pixel from among the four sub-pixels, and a focusing spot formed by each nano-photonic microlens of the plurality of nano-photonic microlenses is located at a center of the 2×2 array including the plurality of photosensitive cells.

13. The image sensor of claim 1, further comprising a color filter layer between the sensor substrate and the nano-photonic microlens array.

14. The image sensor of claim 13, wherein the color filter layer comprises a plurality of color filters that respectively transmit light of different wavelength bands of the incident light, and each color filter of the plurality of color filters comprises one of an organic color filter, an inorganic color filter, or an organic/inorganic hybrid color filter.

15. The image sensor of claim 1, further comprising an anti-reflection layer on a light incident surface of the nano-photonic microlens array.

16. The image sensor of claim 1, wherein each of the plurality of nano-photonic microlenses further comprises a dielectric layer filled in a space among the plurality of nano-structures, and
wherein a refractive index of the plurality of nano-structures is greater than a refractive index of the dielectric layer.

17. The image sensor of claim 1, wherein each nano-structure of the plurality of nano-structures has a circular column shape, a polygonal column shape, a cylindrical shape, or a polygonal container shape.

18. The image sensor of claim 1, wherein each nano-structure of the plurality of nano-structures comprises a first nano-structure and a second nano-structure provided on the first nano-structure.

19. An electronic apparatus comprising:
a lens assembly configured to form an optical image of a subject;
an image sensor configured to convert the optical image formed by the lens assembly into an electrical signal; and
a processor configured to process a signal generated by the image sensor,
wherein the image sensor comprises:
a sensor substrate comprising a plurality of pixels configured to sense incident light; and
a nano-photonic microlens array arranged to face a light incident surface of the sensor substrate, the nano-photonic microlens array comprising a plurality of nano-photonic microlenses configured to condense the incident light,
wherein each of the plurality of pixels comprises:
a plurality of photosensitive cells that are two-dimensionally arranged in a first direction and a second direction perpendicular to the first direction and are configured to independently sense the incident light, and
a first isolation structure extending in the first direction and a second isolation structure extending in the second direction, the first isolation structure and the second isolation structure configured to electrically isolate the plurality of photosensitive cells from each other,
wherein each nano-photonic microlens of the plurality of nano-photonic microlenses comprises a plurality of nano-structures that are configured to output light having a convex phase profile,
wherein the plurality of nano-structures are arranged in a two-dimensional array in a first diagonal direction between the first direction and the second direction and in a second diagonal direction crossing the first diagonal direction, and
wherein a first interval between two nano-structures that are adjacent to each other in the first direction or the second direction, among the plurality of nano-structures, is greater than or equal to a second interval between two nano-structures that are adjacent to each other in the first diagonal direction or the second diagonal direction, among the plurality of nano-structures.

* * * * *